(12) United States Patent
Barone et al.

(10) Patent No.: US 8,812,388 B2
(45) Date of Patent: Aug. 19, 2014

(54) SYSTEMS AND METHODS FOR MULTI-STYLE PORTFOLIO (MSP) CASH FLOW ENHANCEMENT

(75) Inventors: Joseph Anthony Barone, Rutherford, NJ (US); Charles Raymond Smith, III, Hoboken, NJ (US); William McKinney, Westfield, NJ (US); Hari Nanjundamoorthy, West Windsor, NJ (US)

(73) Assignee: Fiserv Investment Solutions, Inc., Brookfield, WI (US)

( * ) Notice: Subject to any disclaimer, the term of this patent is extended or adjusted under 35 U.S.C. 154(b) by 1033 days.

(21) Appl. No.: 11/687,454

(22) Filed: Mar. 16, 2007

(65) Prior Publication Data
US 2007/0168273 A1    Jul. 19, 2007

Related U.S. Application Data

(63) Continuation-in-part of application No. 10/372,706, filed on Feb. 25, 2003, now abandoned.

(51) Int. Cl.
*G06Q 40/00* (2012.01)
*G06Q 40/06* (2012.01)

(52) U.S. Cl.
CPC ..................................... *G06Q 40/06* (2013.01)
USPC ...................................................... 705/36 R

(58) Field of Classification Search
CPC .................................................... G06Q 40/06
USPC ............................................ 705/35–40, 36 R
See application file for complete search history.

(56) References Cited

U.S. PATENT DOCUMENTS

| | | |
|---|---|---|
| 4,346,442 A | 8/1982 | Musmanno |
| 4,566,066 A | 1/1986 | Towers |
| 4,674,044 A | 6/1987 | Kalmus et al. |

(Continued)

FOREIGN PATENT DOCUMENTS

WO    2007002975    11/2007

OTHER PUBLICATIONS

David M Stein "Overlay Portfolio Management in a Multi-Manager Account" Senior Consultant, vol. 5, No. 6, Nov./Dec. 2002.*

(Continued)

*Primary Examiner* — Thomas M Hammond, III
(74) *Attorney, Agent, or Firm* — Sutherland, Asbill & Brennan, LLP

(57) ABSTRACT

Systems and methods are provided for multi-style portfolio cash flow enhancement. The systems and methods include identifying a first set of one or more investment sleeves within an investment account as underweighted relative to a desired target and identifying a second set of one or more investment sleeves within the investment account as overweighted relative to the desired target, where the investment account includes a plurality of investment sleeves and where each investment sleeve includes at least one asset. The systems and methods further include generating one or more sell orders in the second set to rebalance at least one overweighted investment sleeve of the second set to the desired target, associating one or more cash flows with each sell order, where each of the one or more cash flows is further associated with one of the underweighted sleeves of the first set, and performing at least one of the one or more cash flows to flow cash to one or more of the underweighted sleeves if the corresponding sell order is successfully executed.

34 Claims, 17 Drawing Sheets

(56) References Cited

U.S. PATENT DOCUMENTS

| | | | |
|---|---|---|---|
| 4,751,640 A | 6/1988 | Lucas et al. | |
| 5,126,936 A | 6/1992 | Champion et al. | |
| 5,132,899 A | 7/1992 | Fox | |
| 5,193,056 A | 3/1993 | Boes | |
| 5,270,922 A | 12/1993 | Higgins | |
| 5,604,849 A | 2/1997 | Artwick et al. | |
| 5,774,881 A | 6/1998 | Friend et al. | |
| 5,784,696 A | 7/1998 | Melnikoff | |
| 5,806,047 A | 9/1998 | Hackel et al. | |
| 5,812,987 A | 9/1998 | Luskin et al. | |
| 5,819,238 A | 10/1998 | Fernholz | |
| 5,978,778 A | 11/1999 | O'Shaughnessy | |
| 5,999,918 A | 12/1999 | Williams et al. | |
| 6,021,397 A | 2/2000 | Jones et al. | |
| 6,029,148 A | 2/2000 | Zurstrassen | |
| 6,052,673 A | 4/2000 | Leon et al. | |
| 6,092,056 A | 7/2000 | Tull et al. | |
| 6,154,732 A | 11/2000 | Tarbox | |
| 6,161,098 A | 12/2000 | Wallman | |
| 6,175,824 B1 | 1/2001 | Breitzman et al. | |
| 6,272,474 B1 | 8/2001 | Garcia | |
| 6,275,814 B1 | 8/2001 | Giansante et al. | |
| 6,282,520 B1 | 8/2001 | Schirripa | |
| 6,317,726 B1 | 11/2001 | O'Shaughnessy | |
| 6,338,047 B1 | 1/2002 | Wallman | |
| 6,484,151 B1 | 11/2002 | O'Shaughnessy | |
| 6,484,152 B1 | 11/2002 | Robinson | |
| 6,493,681 B1 | 12/2002 | Tertitski et al. | |
| 6,513,019 B2 | 1/2003 | Lewis | |
| 6,516,303 B1 | 2/2003 | Wallman | |
| 6,601,044 B1 | 7/2003 | Wallman | |
| 6,928,418 B2 | 8/2005 | Michaud et al. | |
| 7,117,175 B2 | 10/2006 | Arnott | |
| 7,117,176 B2 | 10/2006 | Wallman | |
| 7,147,313 B2 | 12/2006 | Godil et al. | |
| 7,149,713 B2 | 12/2006 | Bove et al. | |
| 7,158,951 B2 | 1/2007 | Stark | |
| 7,174,313 B1 | 2/2007 | Martinez | |
| 7,177,831 B1 | 2/2007 | O'Shaughnessy et al. | |
| 7,249,080 B1 | 7/2007 | Hoffman | |
| 7,373,324 B1 | 5/2008 | Engin et al. | |
| 7,472,084 B2 | 12/2008 | Damschroder | |
| 7,590,582 B2 | 9/2009 | Dunne | |
| 7,596,523 B2 | 9/2009 | Sobel et al. | |
| 7,634,384 B2 | 12/2009 | Eryurek et al. | |
| 7,711,626 B2 | 5/2010 | Nanjundamoorthy et al. | |
| 7,729,969 B1 | 6/2010 | Smith, III et al. | |
| 7,809,624 B1 | 10/2010 | Smith, III et al. | |
| 7,822,667 B1 | 10/2010 | Smith, III et al. | |
| 2001/0042037 A1 | 11/2001 | Kam et al. | |
| 2002/0035527 A1 | 3/2002 | Corrin | |
| 2002/0038271 A1 | 3/2002 | Friend et al. | |
| 2002/0038273 A1 | 3/2002 | Wherry et al. | |
| 2002/0059127 A1 | 5/2002 | Brown et al. | |
| 2002/0091605 A1 | 7/2002 | Labe et al. | |
| 2002/0095364 A1 | 7/2002 | Russell et al. | |
| 2002/0103733 A1 | 8/2002 | Barrington et al. | |
| 2002/0107735 A1 | 8/2002 | Henkin et al. | |
| 2002/0107770 A1 | 8/2002 | Meyer et al. | |
| 2002/0111891 A1 | 8/2002 | Hoffman et al. | |
| 2002/0120541 A1 | 8/2002 | D'Ambrosio et al. | |
| 2002/0138299 A1 | 9/2002 | Nations | |
| 2002/0138381 A1 | 9/2002 | Tomecek | |
| 2002/0138383 A1 | 9/2002 | Rhee | |
| 2002/0152150 A1 | 10/2002 | Cooper et al. | |
| 2002/0152151 A1 | 10/2002 | Baughman et al. | |
| 2002/0174045 A1 | 11/2002 | Arena et al. | |
| 2002/0174047 A1 | 11/2002 | Fernholz | |
| 2003/0004851 A2 | 1/2003 | Kiron et al. | |
| 2003/0009400 A2 | 1/2003 | Kiron et al. | |
| 2003/0009404 A2 | 1/2003 | Kiron et al. | |
| 2003/0050877 A1 | 3/2003 | Blasnik et al. | |
| 2003/0078867 A1 | 4/2003 | Scott et al. | |
| 2003/0093352 A1 | 5/2003 | Muralidhar et al. | |
| 2003/0093353 A1 | 5/2003 | Ward et al. | |
| 2003/0105697 A1 | 6/2003 | Griffin et al. | |
| 2003/0110113 A1 | 6/2003 | Martin | |
| 2003/0120575 A1 | 6/2003 | Wallman | |
| 2003/0191703 A1 | 10/2003 | Chen et al. | |
| 2003/0220870 A1 | 11/2003 | Bayrooti et al. | |
| 2003/0225662 A1 | 12/2003 | Horan et al. | |
| 2003/0225663 A1 | 12/2003 | Horan et al. | |
| 2004/0002910 A1 | 1/2004 | Mizukami | |
| 2004/0054610 A1 | 3/2004 | Amstutz et al. | |
| 2004/0073506 A1 | 4/2004 | Tull, Jr. et al. | |
| 2004/0078244 A1 | 4/2004 | Katcher | |
| 2004/0083152 A1 | 4/2004 | Markov et al. | |
| 2004/0167849 A1 | 8/2004 | Yass et al. | |
| 2004/0177020 A1 | 9/2004 | Alderman et al. | |
| 2004/0186738 A1 | 9/2004 | Reisman | |
| 2005/0010516 A1* | 1/2005 | Ivanov et al. | 705/36 |
| 2005/0027632 A1 | 2/2005 | Zeitoun et al. | |
| 2005/0055301 A1 | 3/2005 | Cohen et al. | |
| 2005/0171892 A1 | 8/2005 | Naas et al. | |
| 2005/0228734 A1 | 10/2005 | Pagani | |
| 2005/0234793 A1 | 10/2005 | Staub | |
| 2005/0234795 A1 | 10/2005 | Hodes et al. | |
| 2006/0010053 A1 | 1/2006 | Farrow | |
| 2006/0248016 A1 | 11/2006 | Ginter et al. | |
| 2006/0277127 A1 | 12/2006 | Pierdinock et al. | |
| 2007/0094119 A1 | 4/2007 | Marques | |
| 2007/0130043 A1 | 6/2007 | O'Shaughnessy et al. | |
| 2007/0168273 A1 | 7/2007 | Barone et al. | |
| 2007/0192223 A1 | 8/2007 | Cifrese et al. | |
| 2010/0191672 A1 | 7/2010 | Nanjundamoorthy et al. | |

OTHER PUBLICATIONS

PR Newswire: Placemark Introduces Overlay Management Services, Dec. 23, 2003, pp. 1-2.

CheckFree Investment Services, Press Release, Dec. 21, 2003, pp. 1-3.

FPA Journal—The Multiple-Equity Fund Portfolio Investment Strategy, Part 1, Dec. 21, 2003, pp. 1-13.

Stein, et al., Parametric Portfolio Associates, Research Brief, "Overlay Portfolio Management in a Multi-Manager Account", pp. 1-17.

M. Schott, The Tower Group, Inc., 2003, "Chasing CheckFree: Portfolio Management Systems for Multidiscipline Accounts", Jul. 2003, pp. 2-16.

"Implementing a Successful Currency Overlay System." Pensions Week, Sep. 17, 2001, pp. 1-4.

"Investment Styles—Avoid the Pitfalls of Style Investing." Pensions Management, Jun. 1, 2002, pp. 1-3.

Agache, Kristof. "The European Equity Investment Process, Statistical Data Included." Journal of Investing, Dec. 22, 2001, vol. 10, No. 4, pp. 1-10.

Definition of "dividend"—<www.investopedia.com>.

Definition of "record date"—<www.investopedia.com>.

Disclosure under 37 C.F.R. §1.56.

Stein, David M. "Overlay Portfolio Management in a Multi-Manager Account." Senior Consultant, Nov./Dec. 2002, vol. 5, No. 6, pp. 1-8.

Thornthwaite, Warren. "Brace for Incoming." Intelligent Enterprise San Mateo, Aug. 31, 2001, p. 24, vol. 4, issue 13.

"Morgan Keegan Launches New Diversified Portfolio Program"—Business editors. Business Wire, Jan. 27, 2003, p. 1, New York.

Anti, et al. "As Easy as ASP." Euromoney, Feb. 2001, p. 160, Issue 382, London.

Blake, Rich. "Opt In." Institutional Investor, Sep. 2002, p. 183, vol. 36, Issue 9, New York.

Willens. "After the Market's Slide, Avoiding the Wash Sale Rule Becomes Job One for Investors." Journal of Taxation, Dec. 2002, p. 325 (7 pgs.), vol. 97, Issue 6, New York.

Ziv. "How to Use Hedge Funds." Trusts and Estates, Feb. 2001, p. 22 (6 pgs.), vol. 140, Issue 2, Atlanta.

Downes, et al. "Dictionary of Financial and Investment Terms, Fifth Edition." Barron's Educational Series, Inc., 1998.

Hamilton, Walter. "Wall Street, California; Street Strategies; Stock-Mutual Fund Hybrid Attracting Traders, Investors. [Home Edition]" Los Angeles Times, Jun. 6, 2000, p. 1, Los Angeles, California.

(56) References Cited

OTHER PUBLICATIONS

Jorion, Philippe. "Mean/Variance Analysis of Currency Overlays." Financial Analysts Journal, May/Jun. 1994, p. 48 (9 pgs), vol. 50, Issue 3, Charlottesville.
Lauricella. "Making Rebalancing Automatic—Firms Now Offer an Option Many Investors Find Hard to Carry Out on Their Own." Wall Street Journal (European ed.), Feb. 17, 2003, p. M4, Brussels.
Pressman. "Swaps: Student Loan Issuers' Answer to Fiscal Mismatch." Bond Buyer, Nov. 2, 1993, p. 3A, vol. 306, Issue 29271, New York.
"Citigroup Asset Management and Manulife Financial Bring Wider Choice to Multi-Style Managed Accounts." Business Wire, Sep. 18, 2002, pp. 1-3, New York.
"Manulife Financial Enters the Managed Account Business with Manulife Private Account." Business Wire, Sep. 18, 2002, 4 pgs.
"Total Return: An Overlooked Style: As the World Integrates, Real Opportuntiy to Diversify is Through Style." 2002 Global Investment Conference, Sep. 2002, 2 pgs.
Fidelity_403b_Distribution.pdf via http://humanresources.tennessee.edu/benefits/docs/Forms/Deferred/403b/Fidelity%20403b%20distribution.pdf.
IRA Adoption Agreement. The Vanguard Group, Nov. 1999, pp. 1-4.
Luxenberg, Stan. "The Mutual Fund Killer?" Registered Rep, Sep. 2002, v. 26, issue 9, pp. 64-66 (2 pages).
The University of Tennessee, Benefit & Retirement, 403(b) Company Forms via http://humanresources.tennessee.edu/benefits/docs/Forms/Deferred/403b/403b_company_forms.html.
TIAA_403b_Enrollment.pdf via http://humanresources.tennessee.edu/benefits/docs/Forms/Deferred/403b/TIAA403b.pdf.
Winks, Stephen C. "Overlay Management: The Whole Product Solution?" Senior Consultant, Nov./Dec. 2002, v. 5, n. 6.
Non-Final Office Action mailed Nov. 15, 2007 for related U.S. Appl. No. 10/757,726, filed Jan. 15, 2004 which is continuation-in-part of U.S. Appl. No. 10/372,724.
Non-Final Office Action mailed Dec. 10, 2007 for U.S. Appl. No. 10/372,647, filed Feb. 25, 2003.
Non-Final Office Action mailed Dec. 11, 2007 for related U.S. Appl. No. 10/372,708, filed Feb. 25, 2003.
Final Office Action mailed Dec. 12, 2007 for related U.S. Appl. No. 10/372,706, filed Feb. 25, 2003.
Non-Final Office Action mailed Jan. 4, 2008 for related U.S. Appl. No. 10/372,705, filed Feb. 25, 2003.
Final Office Action mailed Feb. 13, 2008 for related U.S. Appl. No. 10/372,715, filed Feb. 25, 2003.
Final Office Action mailed Feb. 21, 2008 for related U.S. Appl. No. 10/372,724, filed Feb. 25, 2003.
Non-Final Office Action mailed Feb. 25, 2008 for related U.S. Appl. No. 10/372,709, filed Feb. 25, 2003.
Final Office Action mailed Mar. 17, 2008 for related U.S. Appl. No. 10/372,650, filed Feb. 25, 2003.
Non-Final Office Action mailed Mar. 17, 2008 for related U.S. Appl. No. 10/372,707, filed Feb. 25, 2003.
Final Office Action mailed Mar. 19, 2008 for related U.S. Appl. No. 10/372,673, filed Feb. 25, 2003.
Final Office Action mailed Apr. 15, 2008 for related U.S. Appl. No. 10/757,728, filed Jan. 15, 2004 which is continuation-in-part of U.S. Appl. No. 10/372,724.
Non-Final Office Action mailed May 29, 2008 for related U.S. Appl. No. 10/372,706, filed Feb. 25, 2003.
Non-Final Office Action mailed Jun. 25, 2008 for related U.S. Appl. No. 10/372,651, filed Feb. 25, 2003.
Non-Final Office Action mailed Jun. 25, 2008 for related U.S. Appl. No. 10/757,709, filed Jan. 15, 2004 which is continuation-in-part of U.S. Appl. No. 10/372,724.
Final Office Action mailed Jul. 24, 2008 for related U.S. Appl. No. 10/757,726, filed Jan. 15, 2004 which is continuation-in-part of U.S. Appl. No. 10/372,724.
Non-Final Office Action mailed Jul. 31, 2008 for related U.S. Appl. No. 10/372,715, filed Feb. 25, 2003.
Final Office Action mailed Aug. 5, 2008 for related U.S. Appl. No. 10/757,548, filed Jan. 15, 2004 which is continuation-in-part of U.S. Appl. No. 10/372,724.
Final Office Action mailed Aug. 5, 2008 for related U.S. Appl. No. 10/989,608, filed Nov. 17, 2004 which is a continuation-in-part of U.S. Appl. No. 10/372,715.
Final Office Action mailed Aug. 14, 2008 for related U.S. Appl. No. 10/372,705, filed Feb. 25, 2003.
Non-Final Office Action mailed Sep. 17, 2008 for related U.S. Appl. No. 10/757,728, filed Jan. 15, 2004 which is continuation-in-part of U.S. Appl. No. 10/372,724.
Final Office Action mailed Oct. 16, 2008 for related U.S. Appl. No. 10/372,709, filed Feb. 25, 2003.
Final Office Action mailed Dec. 1, 2008 for related U.S. Appl. No. 10/757,709, filed Jan. 15, 2004 which is continuation-in-part of U.S. Appl. No. 10/372,724.
Final Office Action mailed Dec. 10, 2008 for related U.S. Appl. No. 10/372,706, filed Feb. 25, 2003.
Final Office Action mailed Dec. 22, 2008 for related U.S. Appl. No. 10/372,651, filed Feb. 25, 2003.
Final Office Action mailed Jan. 21, 2009 for related U.S. Appl. No. 10/372,715, filed Feb. 25, 2003.
Non-Final Office Action mailed Jan. 22, 2009 for related U.S. Appl. No. 10/757,548, filed Jan. 15, 2004 which is continuation-in-part of U.S. Appl. No. 10/372,724.
Non-Final Office Action mailed Jan. 22, 2009 for related U.S. Appl. No. 10/757,726, filed Jan. 15, 2004 which is continuation-in-part of U.S. Appl. No. 10/372,724.
Final Office Action mailed Jan. 23, 2009 for U.S. Appl. No. 10/372,647, filed Feb. 25, 2003.
Final Office Action mailed Feb. 5, 2009 for related U.S. Appl. No. 10/372,705, filed Feb. 25, 2003.
Non-Final Office Action mailed Mar. 16, 2009 for related U.S. Appl. No. 10/372,709, filed Feb. 25, 2013.
Final Office Action mailed Apr. 14, 2009 for related U.S. Appl. No. 10/757,728, filed Jan. 15, 2004 which is continuation-in-part of U.S. Appl. No. 10/372,724.
Non-Final Office Action mailed May 29, 2009 for related U.S. Appl. No. 10/372,706, filed Feb. 25, 2003.
Non-Final Office Action mailed Jul. 22, 2009 for related U.S. Appl. No. 10/372,649, filed Feb. 25, 2003.
Non-Final Office Action mailed Jul. 22, 2009 for related U.S. Appl. No. 10/372,715, filed Feb. 25, 2003.
Non-Final Office Action mailed Jul. 24, 2009 for U.S. Appl. No. 10/372,647, filed Feb. 25, 2003.
Final Office Action mailed Jul. 28, 2009 for related U.S. Appl. No. 10/757,726, filed Jan. 15, 2004 which is continuation-in-part of U.S. Appl. No. 10/372,724.
Final Office Action mailed Sep. 3, 2009 for related U.S. Appl. No. 10/372,705, filed Feb. 25, 2003.
Final Office Action mailed Oct. 1, 2009 for related U.S. Appl. No. 10/372,709, filed Feb. 25, 2003.
Notice of Allowance mailed Jan. 17, 2010 for related U.S. Appl. No. 10/372,705, filed Feb. 25, 2003.
Non-Final Office Action mailed Feb. 4, 2010 for related U.S. Appl. No. 10/372,709, filed Feb. 25, 2003.
Final Office Action mailed Feb. 18, 2010 for related U.S. appl. No. 10/372,649, filed Feb. 25, 2003.
Notice of Allowance mailed May 27, 2010 for U.S. Appl. No. 10/372,647, filed Feb. 25, 2003.
Notice of Allowance mailed Jul. 22, 2010 for U.S. Appl. No. 10/372,709, filed Feb. 25, 2003.
Non-Final Office Action for U.S. Appl. No. 10/372,649 mailed Oct. 2, 2013.
Blanco, Roberto. The Euro-Area Government Securities Markets. Recent Develpopments and Implications for Market Functioning. Autumn Central Bank Economist's Meeting, Oct. 2001.
Non-Final Office Action for U.S. Appl. No. 11/480,688 mailed Dec. 9, 2008.
Final Office Action for U.S. Appl. No. 11/480,688 mailed Jun. 15, 2009.
Notice of Allowance for U.S. Appl. No. 11/480,688 mailed Jan. 26, 2010.

(56) References Cited

OTHER PUBLICATIONS

Non-Final Office Action for U.S. Appl. No. 10/372,725 mailed Jun. 19, 2007.
Non-Final Office Action for U.S. Appl. No. 10/372,652 mailed Jun. 21, 2007.
Non-Final Office Action for U.S. Appl. No. 10/372,706 mailed Jul. 17, 2007.
Non-Final Office Action for U.S. Appl. No. 10/372,724 mailed Jul. 30, 2007.
Non-Final Office Action for U.S. Appl. No. 10/372,715 mailed Aug. 3, 2007.
Non-Final Office Action for U.S. Appl. No. 10/372,673 mailed Aug. 15, 2007.
Non-Final Office Action for U.S. Appl. No. 10/757,727 mailed Aug. 23, 2007.
Non-Final Office Action for U.S. Appl. No. 10/372,646 mailed Aug. 29, 2007.
Non-Final Office Action for U.S. Appl. No. 10/372,648 mailed Aug. 29, 2007.
Non-Final Office Action for U.S. Appl. No. 10/372,650 mailed Sep. 13, 2007.
Non-Final Office Action for U.S. Appl. No. 10/757,728 mailed Oct. 4, 2007.
Non-Final Office Action for U.S. Appl. No. 10/989,608 mailed Oct. 18, 2007.
Non-Final Office Action for U.S. Appl. No. 10/757,548 mailed Nov. 1, 2007.
Non-Final Office Action for U.S. Appl. No. 10/372,651 mailed Nov. 13, 2007.
Final Office Action for U.S. Appl. No. 10/757,548 mailed Jul. 28, 2009.
Non-Final Office Action for U.S. Appl. No. 10/372,649 mailed Oct. 18, 2011.
Final Office Action for U.S. Appl. No. 10/372,649 mailed Apr. 17, 2012.

* cited by examiner

SYSTEMS AND METHODS FOR MULTI-STYLE PORTFOLIO (MSP) CASH FLOW ENHANCEMENT

RELATED APPLICATIONS

The present application is a continuation-in-part of U.S. patent application Ser. No. 10/372,706, filed Feb. 25, 2003, and entitled "Automatic Adjustment of Cash Balances Within Multi-Style Managed Client Investment Accounts." The foregoing application is also incorporated by reference as if fully set forth in its entirety herein.

FIELD OF THE INVENTION

The present invention relates generally to investment portfolio management and more particularly to systems and methods for flowing cash between investment sleeves when rebalancing a Multi-Style Portfolio (MSP) account.

BACKGROUND OF THE INVENTION

A Multi-Style Portfolio (MSP) account may include a plurality of investment sleeves, each of which may include one or more assets. Based upon a variety of factors, including market performance and trading history, one or more investment sleeves may become overweighted while other investment sleeves may become underweighted relative to a desired target value that has been established by a model. In this situation, it may be helpful to rebalance the overweighted and underweighted investment sleeves.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1A:
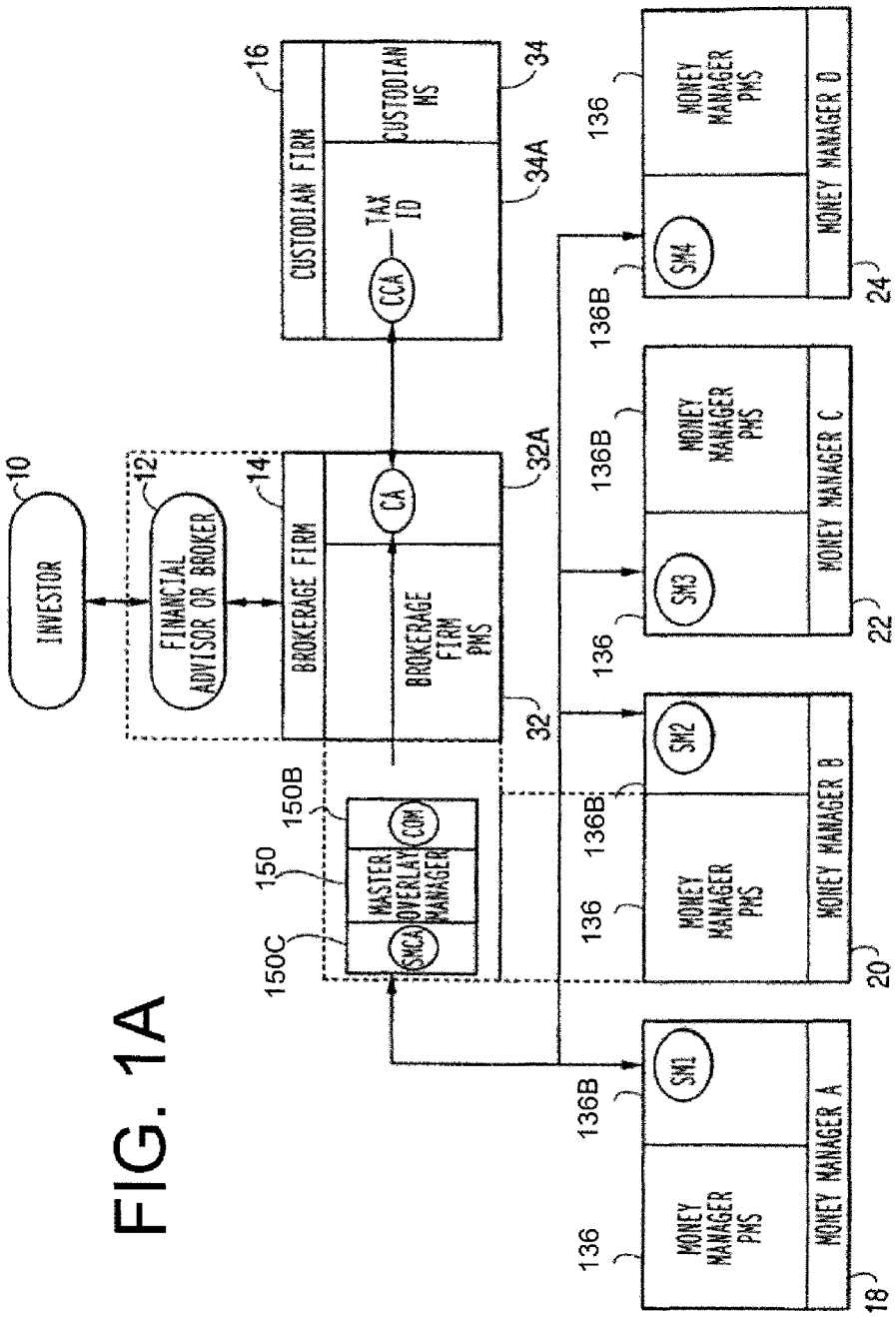
FIG. 1A illustrates an exemplary overview of a multi-style portfolio (MSP) management system architecture in accordance with an embodiment of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams of systems, methods, apparatuses and computer program products according to one or more embodiments of the invention. It will be understood that each block of the block diagrams, and combinations of blocks in the block diagrams, respectively, can be implemented by computer program instructions. These computer program instructions may be loaded onto one or more general purpose computers, special purpose computers, or other programmable data processing apparatuses to produce a machine, such that the combination of computing hardware and instructions which execute thereon constitute means for implementing the functionality of each block of the block diagrams, or combinations of blocks in the block diagrams discussed in detail in the descriptions below.

These computer program instructions may also be stored in a computer-readable memory to constitute an article of manufacture. The article of manufacture may be used in conjunction with a computing device to cause the instructions from the article of manufacture to be loaded onto and executed by the computing device, and thereby implement the function specified in the block or blocks.

The computer program instructions may also be loaded onto one or more computers or other programmable data processing apparatuses to cause a series of operational steps to be performed on the computers or other programmable apparatuses to produce a computer implemented process such that the instructions that execute on the computers or other programmable apparatuses provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by general or special purpose hardware-based computer systems that perform the specified functions or steps, or combinations of general or special purpose hardware and computer instructions.

The inventions may be implemented through one or more application programs running on one or more operating systems of one or more computers. The inventions also may be practiced with diverse computer system configurations, including hand-held devices, multiprocessor systems, microprocessor based or programmable consumer electronics, mini-computers, mainframe computers, and the like.

Application programs may comprise components including modules, objects, data structures, and the like, that perform certain tasks or implement certain abstract data types. A particular application program (in whole or in part) may reside in a single or multiple memories. Likewise, a particular application program (in whole or in part) may execute on a single or multiple computers or computer processors. Exemplary embodiments of the present invention will hereinafter be described with reference to the figures, in which like numerals indicate like elements throughout the several drawings.

Embodiments of the present invention may provide systems and methods for flowing cash between or among investment sleeves when rebalancing a Multi-Style Portfolio (MSP) account. Generally, an investment sleeve may be a portion of the overall MSP account that is managed by one or more money managers to a model in accordance with a respective investment strategy (e.g., an investment style such a large cap, mid cap small cap, value, etc.). Each investment sleeve may include a variety of assets, including cash, stocks, bonds, mutual funds, exchange traded funds (ETFs), exchange traded notes (ETNs), iShares, Treasuries, foreign currency, options, and commodities contracts. It will be appreciated that other assets, including debt instruments, may be associated or included with the investment sleeves.

An exemplary architecture for a multi-style portfolio (MSP) management system and an exemplary method for rebalancing the MSP account will now be discussed with reference to the figures. It will be appreciated that aspects of the exemplary system architecture or rebalancing method may be varied without departing from embodiments of the present invention.

System Architecture

FIG. 1A illustrates an exemplary overview of a multi-style portfolio (MSP) management system architecture in accordance with an embodiment of the present invention. As shown in FIG. 1A, an individual investor 10 opens a client account (CA) with a brokerage firm 14 though the investor's 10 financial advisor or broker 12, who may also be referred to as simply the advisor or financial advisor and may be a member of the brokerage firm 14, as indicated by the dotted lines in FIG. 1A. The brokerage firm 14 may be represented by a brokerage firm 14 portfolio management system (BFPMS) that may include a database for storing the CA, according to an embodiment of the present invention.

Because there is only a single CA, the brokerage firm 14 need only open and the custodian firm 16 need only maintain, a single custodian client account (CCA). Thus, as shown in FIG. 1A, the custodian firm 16 may be represented by a custodian management system that may include a database for storing the CCA, according to an embodiment of the present invention. The database of the custodian firm 16 may be maintained as the authority of record for all transactions associated with the CA.

The system architecture of FIG. 1A may also include multiple money manager portfolio management systems (MMPMSs) 136, each representing a different money manager or at least a different investment style, according to an exemplary embodiment of the present invention. As illustrated in FIG. 1A, each of the four money managers (i.e., money managers A 18, B 20, C 22, and D 24) may be represented by a different MMPMS 136. Each MMPMS may include a respective memory 136B, which may store the applicable money manager's sleeve model (SM). Each sleeve model may be associated with a different investment strategy. The first MMPMS 136 representing the money manager A 18 may include a memory 136B, which stores sleeve model SM1. The second MMPMS 136 representing the money manager B 20 may include a memory 136B, which stores sleeve model SM2. Likewise, the third MMPMS 136 representing money manager C 22 may include a memory 136B, which stores sleeve model SM3. Finally, the fourth MMPMS 136 representing money manager D 234 may include a memory 136B, which stores sleeve model SM4.

The system architecture of FIG. 1A may also include a master overlay manager (MOM) 150, which is a system component that may automate functionality of an overlay manager. The MOM 150 may include a memory 150B having a compiled overlay model (COM), and a database 150C having a stylized managed client account (SMCA). The MOM 150 may be a separate system, operated, for example, by a global money manager, or could be functionally included as part of one of the MMPMS 136 (e.g., part of the MMPMS 136) for money manager B 20 as indicated by one set of dotted lines, according to an exemplary embodiment of the present invention. Alternatively, according to another embodiment of the present invention, the MOM 150 may be functionally included as part of a brokerage firm 14 portfolio management system (BFPMS).

Figure 1B:
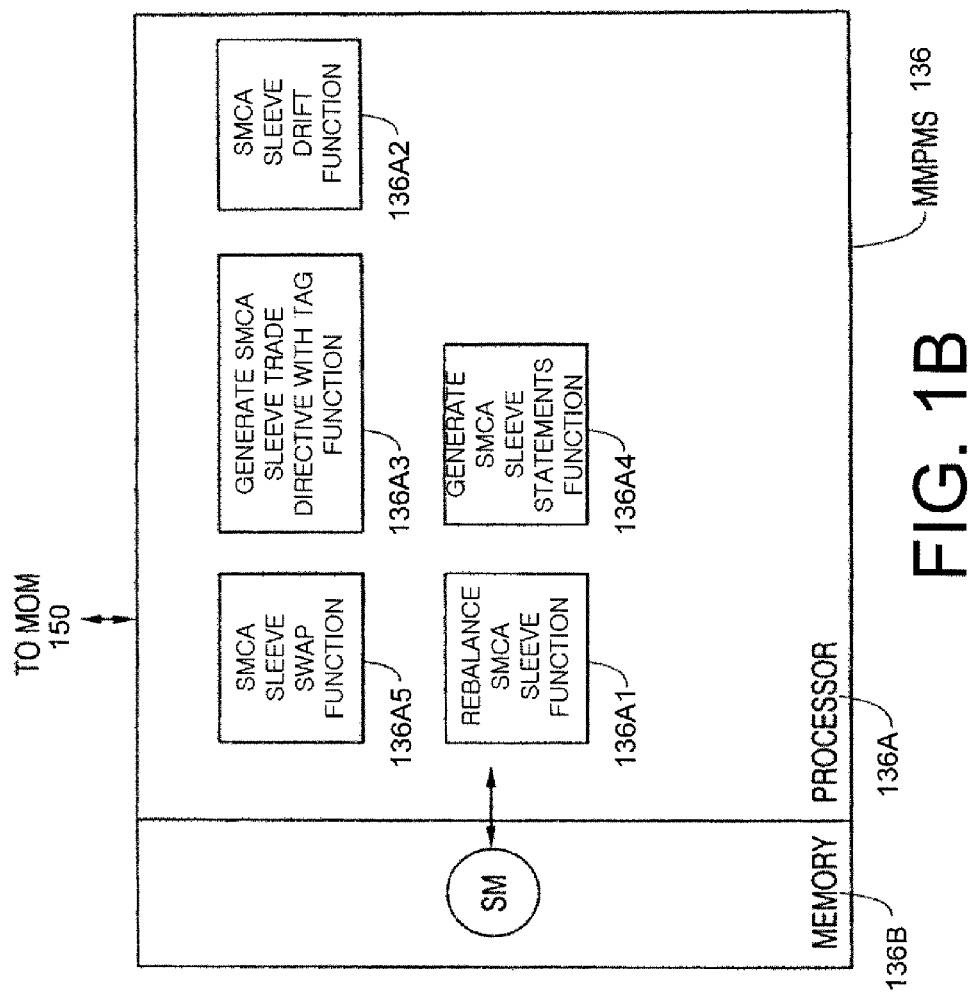
FIG. 1B illustrates an exemplary overview of a money manager portfolio management system (MMPMS) 136 in accordance with an embodiment of the present invention.

FIG. 1B illustrates an exemplary overview of a money manager portfolio management system (MMPMS) 136 in accordance with an embodiment of the present invention. As shown in FIG. 1B, the MMPMS 136 may include a processor 136A and a memory 136B. A sleeve model (SM) may be stored in the memory 136B. For example, the SM stored in the memory 136B shown in FIG. 1B could be any of SM1-SM4 in FIG. 1A, depending on the money manager represented by the particular MMPMS 136.

The processor 136A may be configured (i.e. programmed) with computer-executable logic or program instructions necessary to perform various functions in accordance with embodiments of the present invention. According to an exemplary embodiment of the present invention, the MMPMS 136 may not include a database for storing a managed trading account (MTA) for the investor 10, because the FIG. 1A architecture may not require multiple separately managed trading accounts for the investor 10. Nonetheless, according to an exemplary embodiment of the present invention, the memory 136B may also include a "shadow" of the appropriate portion (e.g., investment sleeve) of the client account (CA) stored in the database of the brokerage firm 14 portfolio management system.

The MMPMS 136 may interface to the MOM 150 as indicated in FIG. 1B. According to an embodiment of the present invention, the interfacing may include synchronous or asynchronous communications to transfer the SM (in its entirety, in parts, or in updates) or other instructions (e.g., swap or trade instructions) to the MOM 150, or to receive updates from the MOM 150 for a locally stored "shadow" account or investment sleeve. Additionally, the interfacing may include synchronous or asynchronous support for accessing and/or modifying the relevant portion of the stylized managed client account (SMCA) stored in database 150C, through money manager tools available in the MMPMS 136, or provided by the MOM 150, or both cooperatively. One or more tokens associated with the particular money manager, for example money manager A 18, could support both identity authentication and access control, correlating to the tagging in the SMCA stored in database 150C and thus restrict access appropriately.

As shown in FIG. 1B, the MMPMS processor 136A may include the logic (e.g., programmed instructions) necessary to perform various exemplary functions in accordance with an exemplary embodiment of the present invention. As illustrated, these exemplary functions may include a rebalance SMCA sleeve function 136A1, a SMCA sleeve drift function 136A2, a generate SMCA sleeve trade directive with tag function 136A3, a generate SMCA sleeve statements function 136A4, and a SMCA sleeve swap function 136A5. Other functions may also be provided without departing from embodiments of the present invention.

As discussed previously, the MMPMS 136 may store a sleeve model (SM) in the memory 136B for the investment style utilized by the applicable money manager. The stored SM may be incorporated in an overlay model utilized by the MOM 150 to generate trade orders and otherwise manage activity on the relevant portion of a single stylized managed client account (SMCA). The MMPMS 136 may store the applicable SM both to record modifications made by the applicable money manager, as well as to perform functions executable by the processor 136A on a relevant portion (e.g., an investment sleeve) of the single managed client account. While the SM has been described with respect to only a single client account, it will be appreciated that the SM may apply to multiple client accounts without departing from embodiments of the present invention.

With regard to the rebalance SMCA style function 136A1, using the illustrative architecture of FIG. 1B, each of the money managers A-D may individually rebalance a portion (e.g., an investment sleeve) of the single managed client account maintained by the MOM 150. This may allow the individual money managers to bring a portion of the single managed client account managed in accordance with that money manager's investment style back in line with the SM for that style. In particular, the processor 136A may execute the rebalance SMCA sleeve function 136A1 to determine the deviation of the applicable portion of the single managed client account maintained by the MOM 150 from the SM stored in the memory 136B. The processor 136A may then generate trade directives by executing the generate SMCA sleeve trade directive with tag function 136A3 to reduce or eliminate the determined deviation and thereby place the relevant portion of the single managed client account in line with the applicable SM.

Drift within a relevant portion of the single of the single managed client account may be monitored and managed by executing the SMCA sleeve drift function 136A2 in accordance with an embodiment of the present invention. The execution of this function by the MMPMS processor 136A may allow the monitoring and managing of drift within the applicable portion of the single managed client account in an automated manner. More particularly, by executing the drift function 136A2, the MMPMS 136 may be able to identify whether a security or other asset in the relevant portion of the single managed client account stored at the MOM 150 has drifted outside a range from a position for that security or asset included in the SM or in other data stored in the memory 36C or another memory or storage device. For example, the range may be established in real time by the processor 36A if so desired, according to an exemplary embodiment of the present invention. The processor 136A may then execute the generate SMCA sleeve trade directive with tag function 136A3 to initiate trade directives in order to reduce or eliminate the drift, and thereby place the relevant portion of the single managed client account in line with the applicable SM. Since drift may be reduced or eliminated one sleeve at a time, and the drift reduction or elimination in each sleeve may typically be performed by a different MMPMS 136, the drift in the single managed client account may be reduced only on a sleeve-by-sleeve basis, according to an exemplary embodiment of the present invention. However, as will be described in more detail, drift in the single managed client account may be reduced by analyzing and rebalancing the entire single managed client account or at least a plurality of investment sleeves.

The processor 136A can also execute the SMCA sleeve swap function 136A5 to swap one type of security (e.g., IBM) for another type of security (e.g., GE) within a relevant portion of the single managed client account. Once the types of securities have been selected, the processor 136A may execute the generate SMCA sleeve trade directive with tag function 136A3 to direct the necessary purchases and sales of securities to accomplish the desired swap. Alternatively, the swap instructions transmitted to the MOM 150 may cause the MOM 150 to generate trades for all affected single managed client accounts. The generate SMCA sleeve statements function 136A4 may also be executed by the processor 136A to generate a statement for the relevant portion (e.g., sleeve) of the single managed client account, which may be managed in accordance with the applicable SM stored in the memory 136B of the applicable MMPMS 136.

Figure 1C:
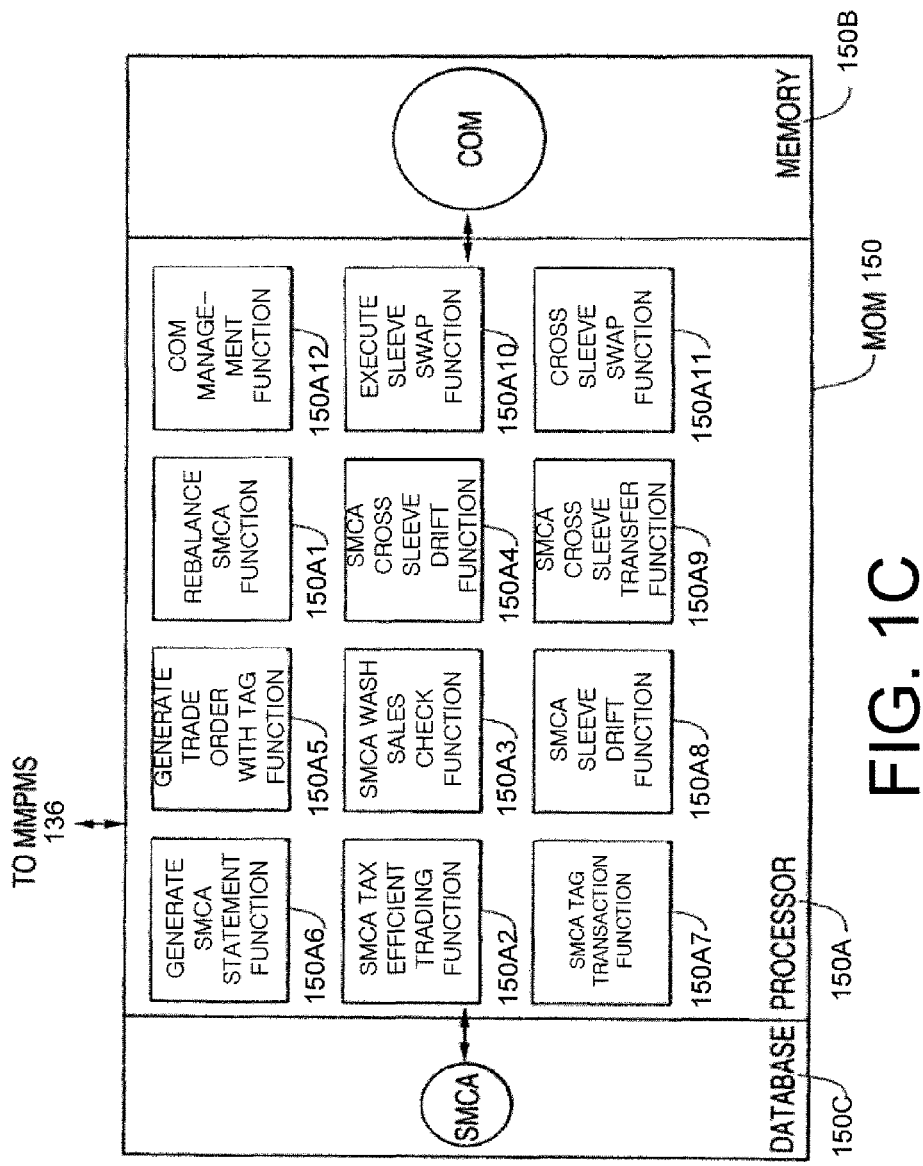
FIG. 1C is an exemplary overview of a master overlay manager (MOM), according an exemplary embodiment of the present invention.

FIG. 1C is an exemplary overview of the master overlay manager (MOM) 150 shown in the FIG. 1A system architecture, according an exemplary embodiment of the present invention. As shown in FIG. 1C, the MOM 150 may include a processor 150A, which includes the logic (e.g., programmed instructions) necessary to perform various functions in accordance with embodiments of the present invention. The MOM 150 may be capable of performing all of the functions shown in FIG. 1C or less than all of the functions illustrated in FIG. 1C. Alternative embodiments may also include additional functions not illustrated in FIG. 1C without departing from embodiments of the present invention.

The MOM 150 also includes a memory 150B, which stores a compiled overlay model (COM). The MOM 150 may also include a single managed client account which is stored in a database 150C of the MOM 150. The MOM 150 may also include an interface to the MMPMS 136.

The functions executable by the processor 150A may include a rebalance SMCA function 150A1, SMCA tax efficient trading function 150A2, SMCA wash sale check function 150A3, SMCA across sleeve drift function 150A4, generate trade order with tag function 150A5, generate SMCA statement function 150A6, SMCA tag function transaction function 150A7, SMCA sleeve drift function 150A8, SMCA across sleeve transfer function 150A9, an execute sleeve swap function 150A10, SMCA across sleeve transfer function 150A11, and a COM management function 150A12. Hence, although trade directing and account management functions can be performed by the MMPMS 136 at the sleeve level in the FIG. 1A architecture, there is a single managed client account that can be managed and transacted by the MOM 150, via execution of the functions 150A1-150A12 by the processor 150A.

The COM stored in the memory 150B may combine the sleeve models (e.g., SM1-SM4) for each of the investment styles (e.g., style 1-style 4) into the COM for the SMCA being utilized for the investor 10. The SMCA may be shadowed by the CA stored in the database 32A of the BFPMS 32 representing the brokerage firm. If the MOM 150 is incorporated with BFPMS 32, the CA may be replaced by the SMCA, eliminating the need for the database 150C.

It will be appreciated that although trade orders may usually be initiated by the MOM 150, each MMPMS 136 may also direct the initiation of such trade orders for a respective portion of the SMCA. On the other hand, the MOM 150 may also independently initiate trade orders and other account management functions for the entire SMCA stored at the database 150C. The interface between each MMPMS 136 and the MOM 150 facilitates the necessary coordination between the overlay manager and the individual money managers that is necessary to properly transact and manage the SMCA.

By executing the rebalance SMCA function 150A1, the MOM processor 150A may automatically rebalance the SMCA maintained in the database 150C, based on the multi-style COM stored at the memory 150B. As will be described in detail below, the rebalancing may be performed across the entire SMCA and accordingly, across multiple investment sleeves.

The MOM processor 150A may also execute the SMCA tax efficient trading function 150A2 to, for example, determine the appropriate lots or positions in securities held in the SMCA to sell at a loss to offset gains made earlier in the tax year and thereby reduce the tax burden on this investor 10. This process may be referred to as tax loss harvesting. The execution of the SMCA tax efficient trading function 150A2 may allow the processor 150A to identify the lots of or positions in securities in any sleeve that may be sold from the SMCA of the investor 10 to offset the gains due to prior sales of securities for the investor 10. Once the preferred lots of or positions in securities have been identified, the MOM processor 150A executes the generate trade order with tag function 150A5 to initiate the sale of the identified securities or positions, and thereby reduces or eliminates the prior capital gain for the tax year as thus the associated investor 10 tax burden.

The MOM processor 150A may also execute the SMCA wash sale function 150A3 to avoid a wash sale violation. Such a violation may arise when shares of a particular type of security in the SMCA were previously sold for a capital loss for the investor 10, and shares of that security are repurchased for the investor 10 within third-one (31) days of the earlier sale, or some other predetermined period (e.g., a violation period) according to tax laws. Accordingly, a sale of a security for a capital loss that is classified as a wash sale may prevent the immediate deduction of that loss in the calendar year of the sale. Instead, the amount of the loss may be added to the basis of the repurchased security.

In order to track potential wash sales, the MOM 150 may, by executing the SMCA wash sale function 150A3, determine whether shares of a security proposed to be purchased for the SMCA of investor 10 were previously sold at a loss from any sleeve in the SMCA during the violation period. Only after determining that no such sale occurred during the violation period will the processor 150A execute the generate trade order with tag function 150A5 to initiate the desired trade order. Thus, wash sale violations may be avoided in the SMCA, according to an exemplary embodiment of the present invention.

The MOM 150 may also monitor and manage drift between or among the multiple sleeves associated with the SMCA of the investor 10. More particularly, the MOM processor 150A may execute the SMCA across sleeve drift function 150A4 to proactively monitor and manage drift between the different sleeves represented in the SMCA, away from the allocations across the multiple sleeves set forth in the COM stored in the memory 150B of the MOM 150.

As will be discussed in further detail below, the processor 150A may identify whether a sleeve of securities in the SMCA of the investor 10 has drifted outside of a range, which may be computed by the processor 150A or stored in the memory 150B as part of the COM, from the sleeve allocation established in the COM. The processor 150A may then generate trade orders by executing the generate trade order with tag function 150A5 to reduce or eliminate the drift and thereby place the SMCA for investor 10 in line with the COM. Hence, the drift may be reduced or eliminated across all or a plurality of sleeves in the SMCA.

The processor 150A of the MOM 150 may also execute the generate SMCA statement function 150A6 to create statements or reporting on the performance or history of the SMCA of investor 10. By executing the function 150A6, the processor 150A may be capable of generating statements both on an individual sleeve basis and an entire account basis. The generated statements, whether for an individual sleeve or the entire SMCA, may provide either detailed or summary performance information. The processor 150A of MOM 150 may also execute an SMCA tag transaction function 150A7 to tag transactions other than those tagged in the execution of the generate trade order with tag function 150A5 with the associated sleeve(s).

The processor 150A of MOM 150 may also execute an SMCA sleeve drift function 150A8 to proactively monitor and manage drift in an individual sleeve reflected in a portion of the SMCA. This monitoring may be similar to that performed by the MMPMS 136 when executing the SMCA sleeve drift function 136A2, as described above with respect to FIG. 1B. However, in the case of the MOM 150, rather than generating sleeve trade directives in view of the determined sleeve drift, the processor 150A may execute the generate trade order with tag function 150A5 to reduce or eliminate the determined sleeve drift.

By executing the SMCA across sleeve transfer function 150A9, the processor 150A of MOM 150 may efficiently perform across-sleeve movement of securities. Based upon the transfer identified in the execution of the SMCA across sleeve transfer function 150A9, the processor 150A may execute the SMCA tag transaction function 150A7 to tag the security transfer transaction.

The COM execute sleeve swap function 15A0 may allow the MOM 150 to execute the sleeve swaps as directed by the sleeve managers. The MOM 150 may implement the sleeve swap instructions, and the processor 150A executes the tag transaction function 150A7 to tag the security swap transaction. It should be appreciated that the MOM 150 may also have the ability to execute an across sleeve swap function 150A11 as well. In this instance, the MOM 150 may need to have control or permission from the sleeve managers to enact changes to their individual styles, according to an exemplary embodiment of the present invention. Once permission is received, the MOM 150 can make changes to models, creating offsetting trades in different sleeves, and execute those trades. Also, as will be described in further detail below, the MOM 150 may have the ability to move cash within the SMCA, and thus a sale in one sleeve could generate cash for a purchase in another sleeve.

The MOM 150 may also be the controller of the COM and execute the COM management function 150A12 to control the COM. As such, in some embodiments of the present invention, the MOM 150 may make changes directly in the styles provided by the sleeve managers. In some embodiments of the present invention, the sleeve managers may provide their styles and give the MOM 150 full control of their style, thus allowing the MOM 150 to have discretion over the styles, and thus over all COMs. The individual sleeve managers can also be given the ability to interact directly with the SMCA by executing functions found in the processor 150A via the interface. In some embodiments of the present invention, the MOM 150 may give the individual sleeve managers the ability, for instance, to trade directly on the SMCA, rather than provide trade instructions to the MOM 150. This may result in additional flexibility when trading an investor's 10 account. There may be no need to wait for the MOM 150 to enact the trade; the sleeve manager can update his or her style, and then create the trade directly. According to an embodiment of the present invention, how the processor 150A is used may depend on how the MOM 150 configures the COM management function 150A12.

Although not illustrated as such in FIGS. 1A-1C, the MMPMS 136 and/or MOM 150 may also provide for SMCA restriction identification and violation resolution without departing from embodiments of the present invention. Such restrictions may impact whether or the extent to which buy or sell orders may be executed when rebalancing the MSP account and/or flowing cash between sleeves, as will be described below according to an embodiment of the present invention. Generally, a restriction may be a directive concerning those assets to which the restriction applies. The restriction may apply to the entire single managed client account or to one or more investment sleeves of the SMCA. Oftentimes a restriction may direct that a certain asset not be held in the account or investment sleeve. However, a restriction could also direct other aspects of an investment account's holdings. Such an aspect could be, but is not limited to, that an investment account or sleeve always hold a certain asset, or that a certain amount of a particular asset always be held in an investment account or sleeve.

Having described an exemplary system architecture of an embodiment of the present invention, an exemplary method for rebalancing an MSP account, as supported by the foregoing system architecture, will now be discussed in further detail below.

Rebalancing a Multi-Style Portfolio (MSP) Account

Figure 2:
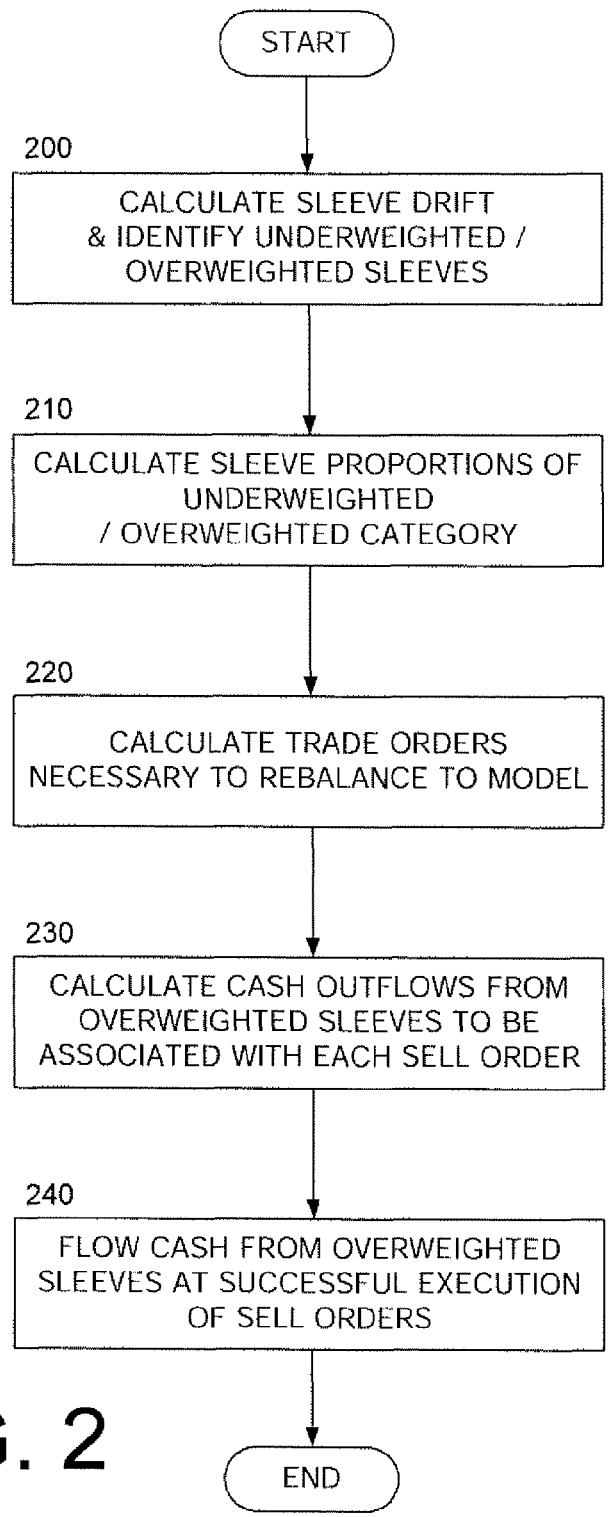
FIG. 2 illustrates an overview of the process for flowing cash when rebalancing a plurality of sleeves within a Multi-Style Portfolio (MSP) account, according to an exemplary embodiment of the present invention.

In accordance with an embodiment of the present invention, the portfolio management system 100 (e.g., the MOM 150) may be operative to flow cash between or among investment sleeves when rebalancing a Multi-Style Portfolio (MSP) account (e.g., a stylized managed client account (SMCA) that may have a plurality of investment sleeves, each invested according to a respective investment style). FIG. 2 illustrates an overview of the process for flowing cash when rebalancing a plurality of investment sleeves within an MSP account.

Referring now to step 200 of FIG. 2, the investment style drift amounts may be calculated and any resulting underweighted/overweighted investment styles may then be identified. As will be discussed in further detail below, in order to calculate the underweighted/overweighted sleeve drift amounts, the current market value of each asset in each investment style of the MSP account may first be determined using real-time or near-real-time information. Using these current market values, a rollup total for each investment sleeve as well as for the MSP account as a whole may be calculated. Then the current percentages for each asset and each investment sleeve (compared to the rollup total for the MSP account as a whole) may be determined. These values may be compared to corresponding target values in an overlay model (e.g., a compiled overlay model (COM)) for the MSP account, style model, etc.). Sleeve-level drift amounts as well as asset-specific drift amounts may then be calculated. Those investment sleeves with negative drift amounts may be identified as underweighted, while those investment sleeves with positive drift amounts may be identified as overweighted.

In step 210, for each investment sleeve in the underweighted category, the proportion of the total underweighted amount may be determined and associated with that particular investment sleeve. Likewise, in step 210, for each investment sleeve in the overweighted category, the proportion of the total overweighted amount may be determined and associated with that particular investment sleeve. Next, in step 220, the trade orders (e.g., sell and buy orders) necessary to rebalance in accordance with the overlay model may be determined. In step 230, cash outflows from overweighted sleeves to be associated with each sell order may be calculated. In particular, the cash outflows may be associated with the proceeds of each sell order in each overweighted sleeve. A number N outflows may be identified for each sell order, where N=number of underweighted sleeves. The amount of the each outflow may take into account one or more of the following: 1) the expected inflow requirement in each underweighted sleeve, 2) the proportion of the overweighted total represented by the sleeve of the current sell order, and 3) the proportion of all sell orders in the current sleeve represented by the current sell order. According to an embodiment of the present invention, each cash flow may be represented by a "deliver to" transaction (for the outflow from an overweighted sleeve) and a "receive from" transaction (for the corresponding inflow into the underweighted sleeve), and each outflow or inflow may be appropriately tagged (e.g., using SMCA tag transaction function 150A7 or the like). In step 240, cash may be flowed from overweighted sleeves to underweighted sleeves upon successful execution of the sell orders. Steps 200-240 that were introduced above will now be discussed in further detail with reference to FIGS. 3A-8B.

Figure 3A:
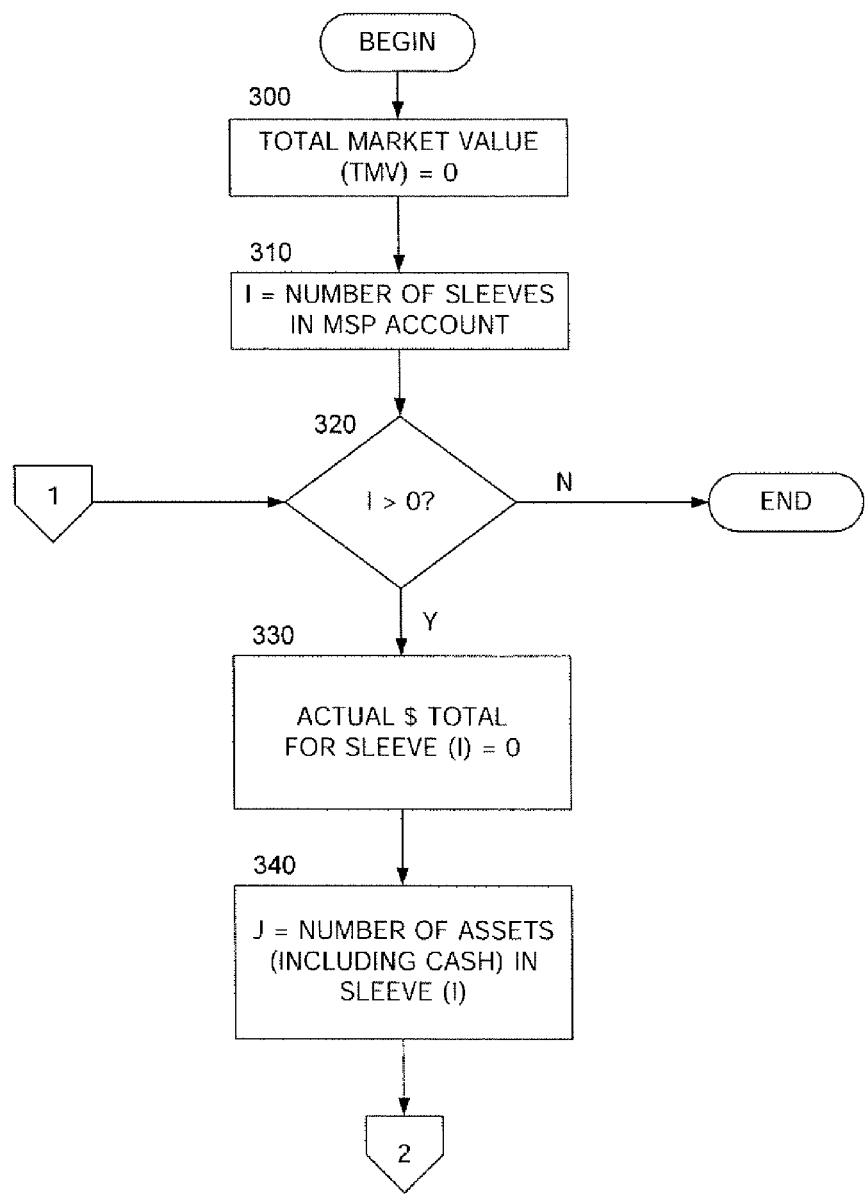
FIGS. 3A-3B illustrate an exemplary process for calculating a current value of each asset in every sleeve in the MSP account, and rolling these values up to determine a current actual value for each investment sleeve and a total current market value for the MSP account, according to an embodiment of the present invention.
Figure 3B:
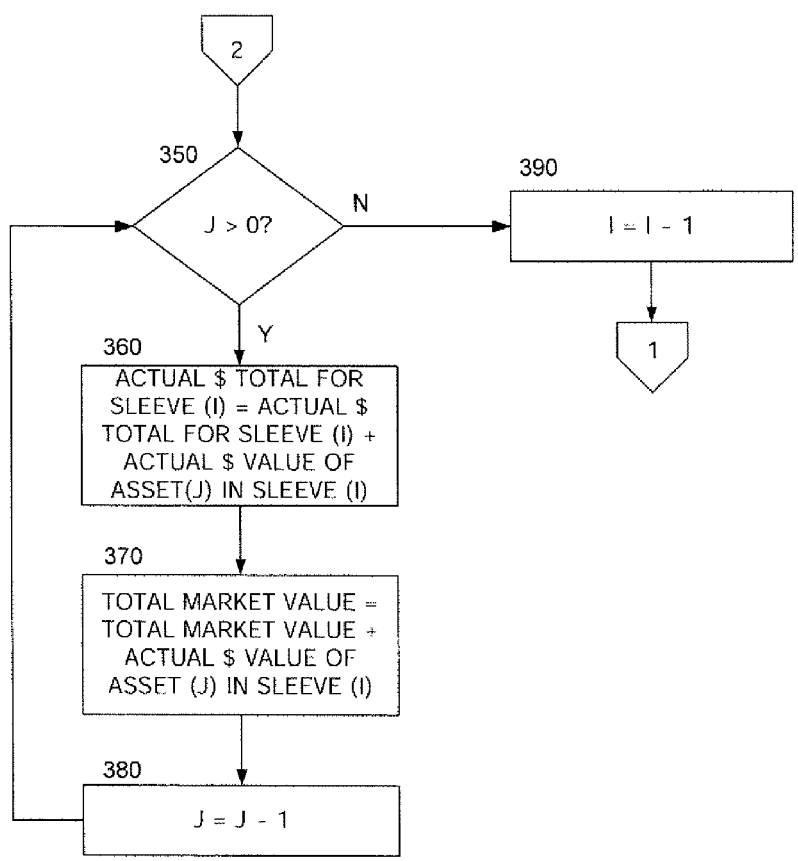
Figure 4A:
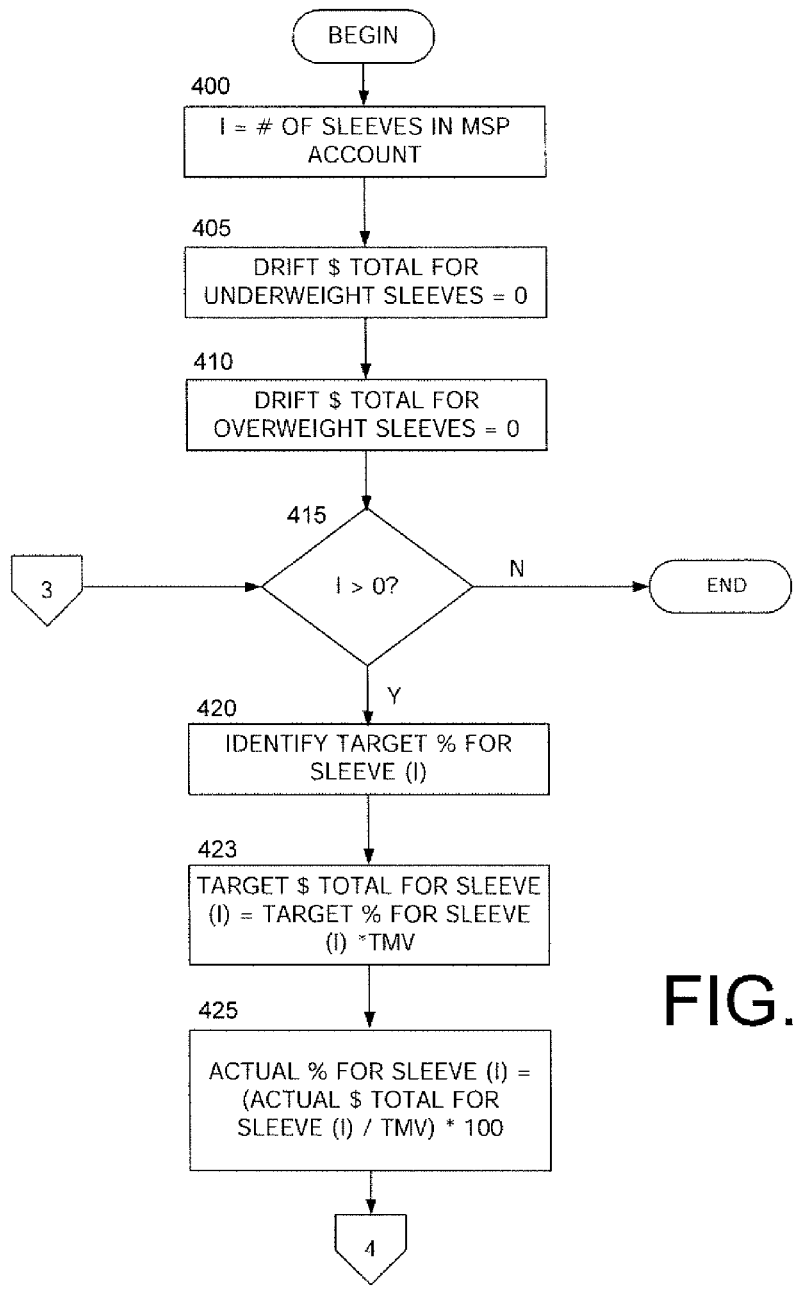
FIGS. 4A-4C illustrate an exemplary process for calculating drift amounts, identifying each sleeve as underweighted or overweighted, and accumulating a total of drift amounts for all underweighted sleeves and a total of drift amounts for all overweighted sleeves, according to an exemplary embodiment of the present invention.
Figure 4B:
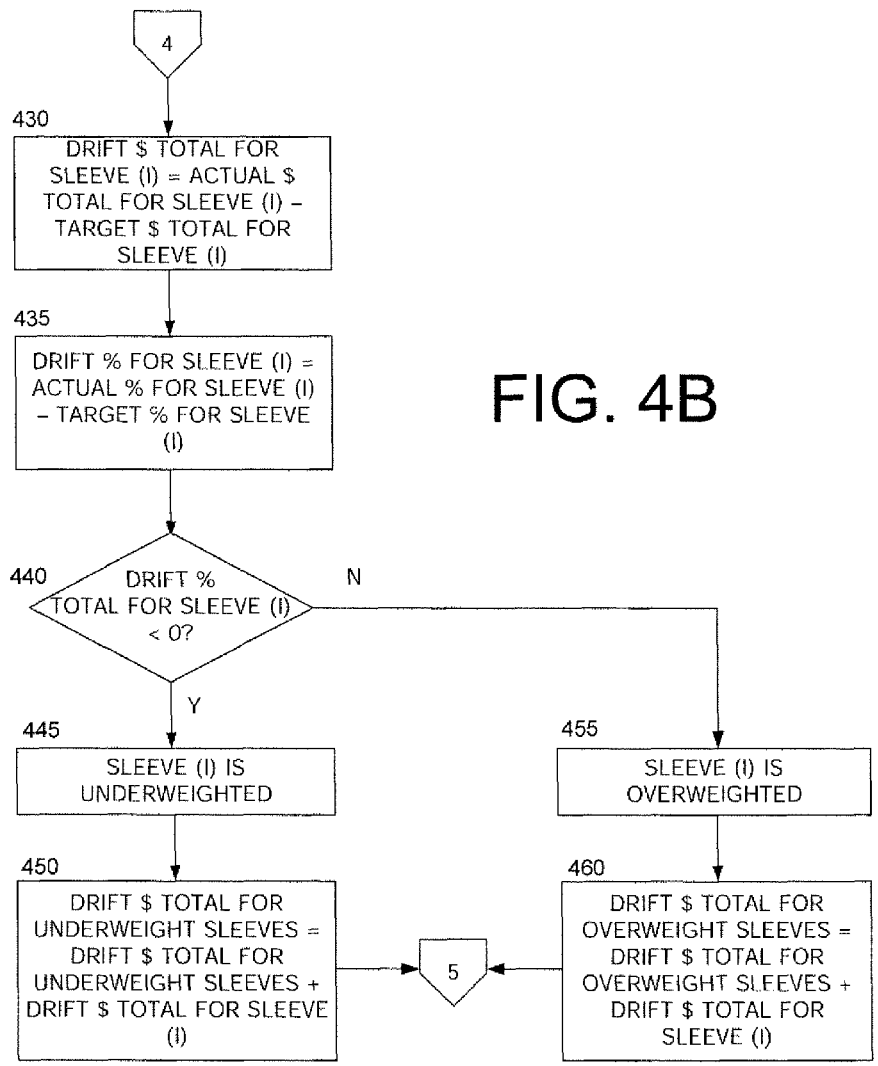
Figure 4C:
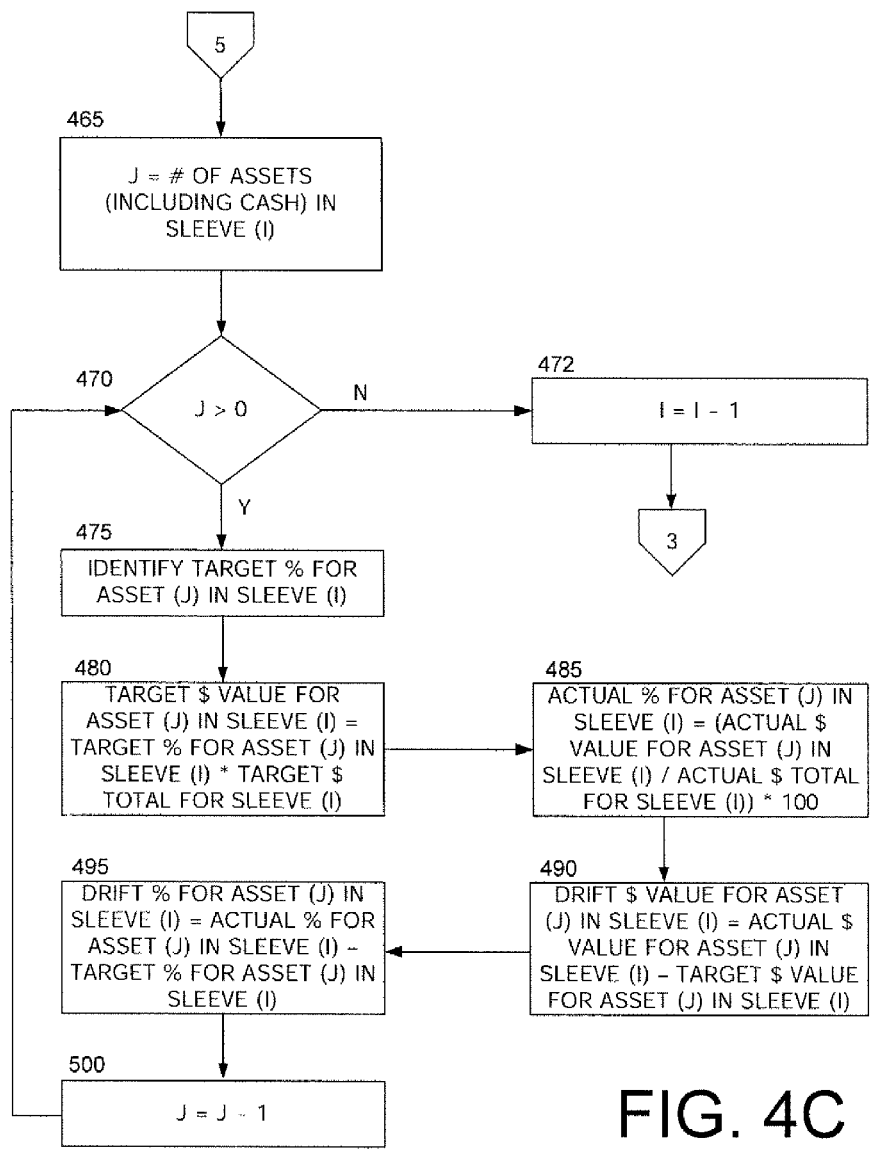

Step 200 in FIG. 2 will now be discussed in further detail with respect to FIGS. 3A-3B and 4A-4B. As introduced above, step 200 may include the following: (i) calculating a current value of each asset in every sleeve in the MSP account, and rolling these values up to determine a current actual value for each investment sleeve and a total current market value for the MSP account (as illustrated in FIGS. 3A-3B) and (ii) calculating drift amounts, identifying each sleeve as underweighted or overweighted, and accumulating a total of drift amounts for all underweighted sleeves and a total of drift amounts for all overweighted sleeves (as illustrated in FIGS. 4A-4C).

First, the process for calculating a current value of each asset in every investment sleeve in the MSP account, and rolling these values up to determine a current actual value for each investment sleeve and a total current market value for the MSP account will now be discussed with reference to FIGS. 3A and 3B. In step 300, the total market value (TMV) of the MSP account may be initialized (e.g., TMV=0). In step 310, indicator I may be set to the number of sleeves in the MSP account. Note that indicator I may also control iterations of a loop between steps 320 and 390. Step 320 may check to determine whether all sleeves in the MSP account have been processed (e.g., I>0). If so (e.g., I>0 is not satisfied), processing for this subroutine ends. If not (e.g., I>0 is satisfied), then the actual monetary total for the Ith sleeve may be initialized (e.g., set to zero).

In step 340, indicator J may be set to the number of assets in sleeve I. The assets may include cash, according to an embodiment of the present invention. Likewise, the assets may also include securities such as stocks, bonds, mutual funds, exchange traded funds (ETFs), exchange traded notes (ETNs), iShares, Treasuries, foreign currency, options, and commodities contracts. Indicator J may control iterations of a loop between steps 350 and 380. Step 350 may determine whether all of the assets within the Ith sleeve have been processed (e.g., J>0). If not (e.g., J>0 is satisfied), then the actual monetary total for the Ith sleeve may be updated to include the actual monetary value of the Jth asset in the Ith sleeve, as illustrated by step 360. In addition, in step 370, the total market value (TMV) of the MSP account may likewise be updated to include the actual monetary value of the Jth asset in the Ith sleeve. According to an embodiment of the present invention, the actual monetary value of the Jth asset in the Ith sleeve may be determined as one of the following: (i) for cash, the monetary value may be the amount of cash present in or attributable to the Ith sleeve and (ii) for non-cash assets, the monetary value may be a product of the number of units of the Jth asset and the current market price for one unit of the Jth asset. Next, in step 380, the indicator J may be decremented (e.g., to signify completion of processing the Jth asset in the Ith sleeve) and processing may return to step 350. In step 350, if all of the assets within the Ith sleeve have been processed (e.g., J>0 is not satisfied), then the indicator I may be decremented in step 390 with processing returning to step 320 until all sleeves in the MSP account have been processed.

Second, the process for calculating drift amounts, identifying each sleeve as underweighted or overweighted, and accumulating a total of drift amounts for all underweighted sleeves and a total of drift amounts for all overweighted sleeves will now be discussed with reference to FIGS. 4A-4C. In step 400, the indicator I may be set to the number of sleeves in the MSP account. In step 405, the drift monetary total for underweighted sleeves may be initialized (e.g., set to zero). Likewise, in step 410, the drift monetary total for overweighted sleeves may also be initialized (e.g., set to zero).

Step 415 determines whether all of the sleeves in the MSP account have been processed (e.g., I>0). If so (e.g., I>0 is not satisfied), processing for this subroutine ends. If not (e.g., I>0 is satisfied), then in step 420, the target percentage for the Ith sleeve may be identified. According to an embodiment of the present invention, the target percentage for the Ith sleeve may be identified from an overlay model (e.g., a COM, a style model, etc.) associated with the MSP account. In step 423, the target monetary total for the Ith sleeve may be determined as the product of the target percentage for the Ith sleeve and the TMV. In step 425, the actual percentage for the Ith sleeve may be determined as the actual monetary value for the Ith sleeve divided by the TMV, the result of which is multiplied by 100 to form a percentage. Next, in step 430, the drift monetary total for the Ith sleeve may be determined as the difference between the actual monetary total for the Ith sleeve and the target monetary total for the Ith sleeve. In step 435, the drift percentage for the Ith sleeve may be determined as the difference between the actual percentage of the Ith sleeve and the target percentage for the Ith sleeve. According to an embodiment of the present invention, the target monetary total for the Ith sleeve and/or the target percentage for the Ith sleeve may be determined using the overlay model associated with the MSP account.

Step 440 determines whether the drift percentage total for the Ith sleeve is less than zero. If so, then the Ith sleeve is determined as being underweighted (step 445) and the drift monetary total for underweighted sleeves is updated to include the drift monetary total for the Ith sleeve (step 450). On the other hand, if the Ith sleeve is less than zero, then the Ith sleeve is determined as being overweighted (step 455) and the drift monetary total for overweighted sleeves is updated to include the drift monetary total for the Ith sleeve (step 460). It will be appreciated that alternative methods may be utilized for determining whether investment sleeves are overweighted or underweighted. For example, instead of determining a positive or negative drift monetary total, a comparison can be performed between an actual monetary total and target monetary total to determine whether an investment sleeve is overweighted or underweighted.

In step 465, the indicator J may be set to be the number of assets in the Ith sleeve. As described above, these assets may include cash and/or securities. Step 470 determines whether all of the assets in the Ith sleeve have been processed (e.g., J>0 is satisfied). If there are still assets in the Ith sleeve that have not yet been processed, then in step 475, the target percentage for the Jth asset in the Ith sleeve may be identified. According to an embodiment of the present invention, the target percentage may be identified from an overlay model associated with the MSP account. In step 480, the target value for the Jth asset in the Ith sleeve may be determined as the product of the target percentage for the Jth asset in the Ith sleeve and the target monetary total for the Ith sleeve. In step 485, the actual percentage for the Jth asset in the Ith sleeve may be determined as the ratio of the actual monetary value for the Jth asset in the Ith sleeve to the actual monetary total for the Ith sleeve, the result of which is multiplied by 100 to form a percentage. In step 490, the drift monetary value for the Jth asset in the Ith sleeve may be determined as a difference between the actual monetary value for the Jth asset in the Ith sleeve and the target monetary value for the Jth asset in the Ith sleeve. Next, in step 495, the drift percentage for the Jth asset in the Ith sleeve may be determined as the difference between the actual percentage for the Jth asset in the Ith sleeve and the target percentage for the Jth asset in the Ith sleeve. The indicator J may then be decremented in step 500 to signify completion of processing for the Jth asset in the Ith sleeve. Processing then resumes with step 470 determining whether all of the assets in the Ith sleeve have been processed. If step 470 determines that all of the assets in the in the Ith sleeve have been processed (e.g., J>0 is not satisfied), then the indicator I may be decremented in step 472, and the process may continue with step 415.

Figure 5:
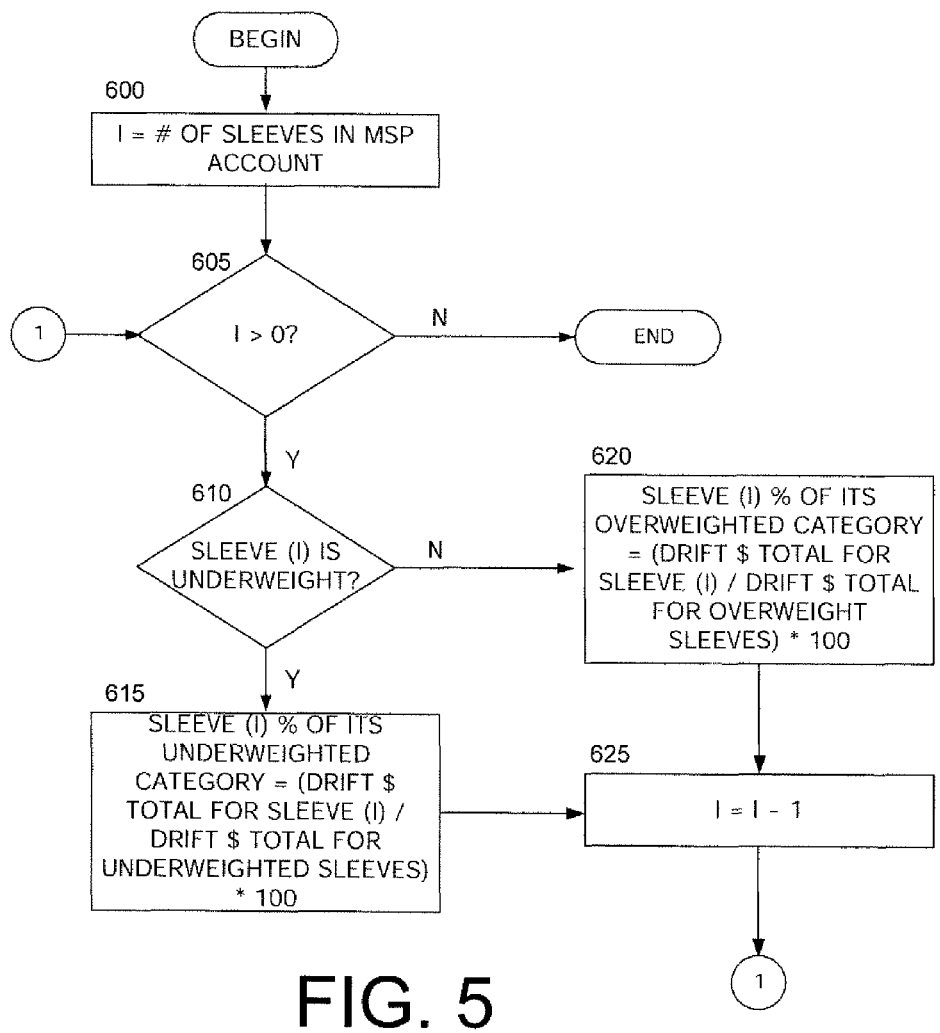
FIG. 5 illustrates an exemplary process in which for each investment sleeve in an underweighted or overweighted category, the proportion of the respective total underweighted or underweighted amount may be determined and associated with that particular investment sleeve, according to an exemplary embodiment of the present invention.

FIG. 5 illustrates step 210 of FIG. 2 in which for each investment style in an underweighted or overweighted category, the proportion of the respective total underweighted or underweighted amount may be determined and associated with that particular investment sleeve. More particularly, in step 600, the indicator I may be set to the number of sleeves in the MSP account. Indicator I may also control the processing loop between steps 605 and 625. In particular, step 605 determines whether all of the styles within the MSP account have been processed (e.g., I>0). If so (e.g., I>0 is not satisfied), then processing ends. If not (e.g., I>0 is satisfied), then step 610 determines whether the Ith sleeve is underweighted. If the Ith sleeve is underweighted (step 610), then in step 615, the Ith sleeve percentage of its underweighted category may be determined as the ratio of the drift monetary total for the Ith sleeve to the drift monetary total for underweighted sleeves, the result of which is multiplied by 100 to form a percentage. On the other hand, if the Ith sleeve is not underweighted (step 610), then in step 620, the Ith sleeve percentage of its overweighted category may be determined as the ratio of the drift monetary total for the Ith sleeve to the drift monetary total for overweighted sleeves, the result of which is multiplied by 100 to form a percentage. Following steps 615 or 620, processing proceeds with step 625 decrementing the indicator I to signify completion of processing of the Ith sleeve. Processing then continues with step 605 determining whether all sleeves in the MSP account have been processed.

Figure 6A:
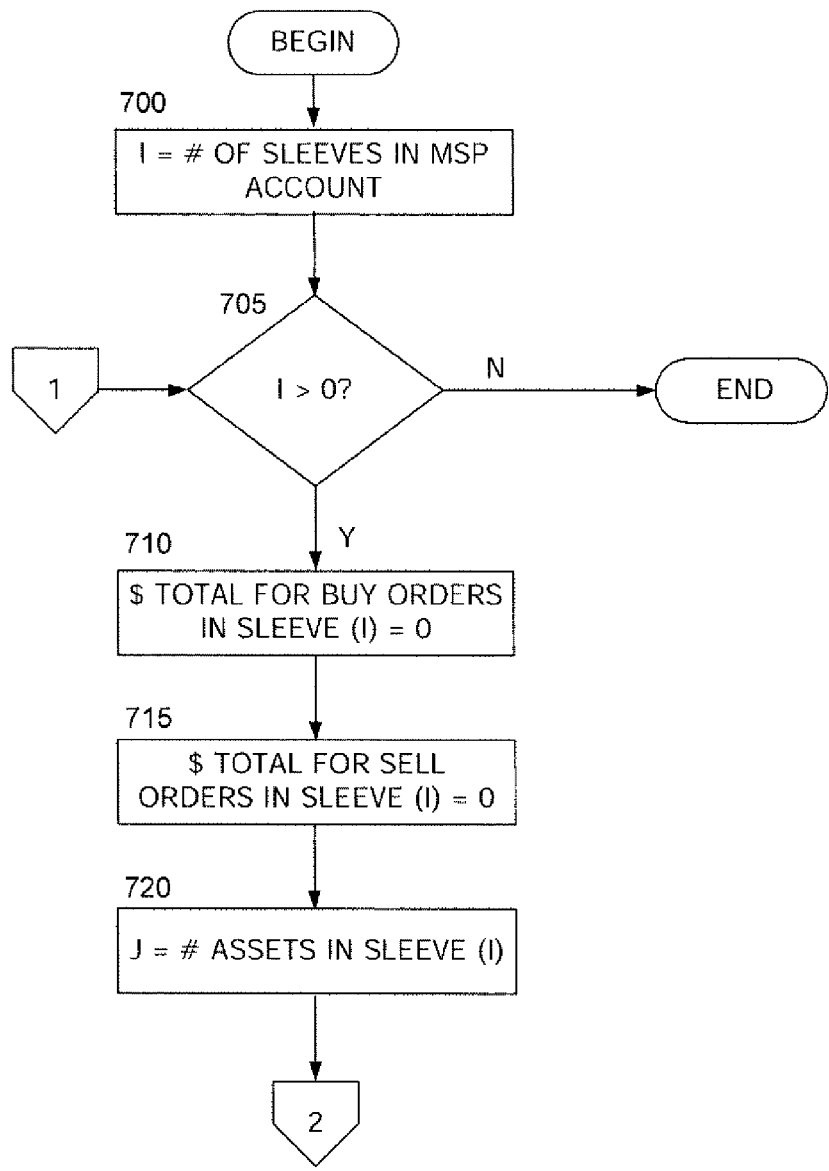
FIGS. 6A-6C illustrate a process in which the trade orders (e.g., sell and buy orders) necessary to rebalance to the overlay model may be determined in accordance with an embodiment of the present invention.
Figure 6B:
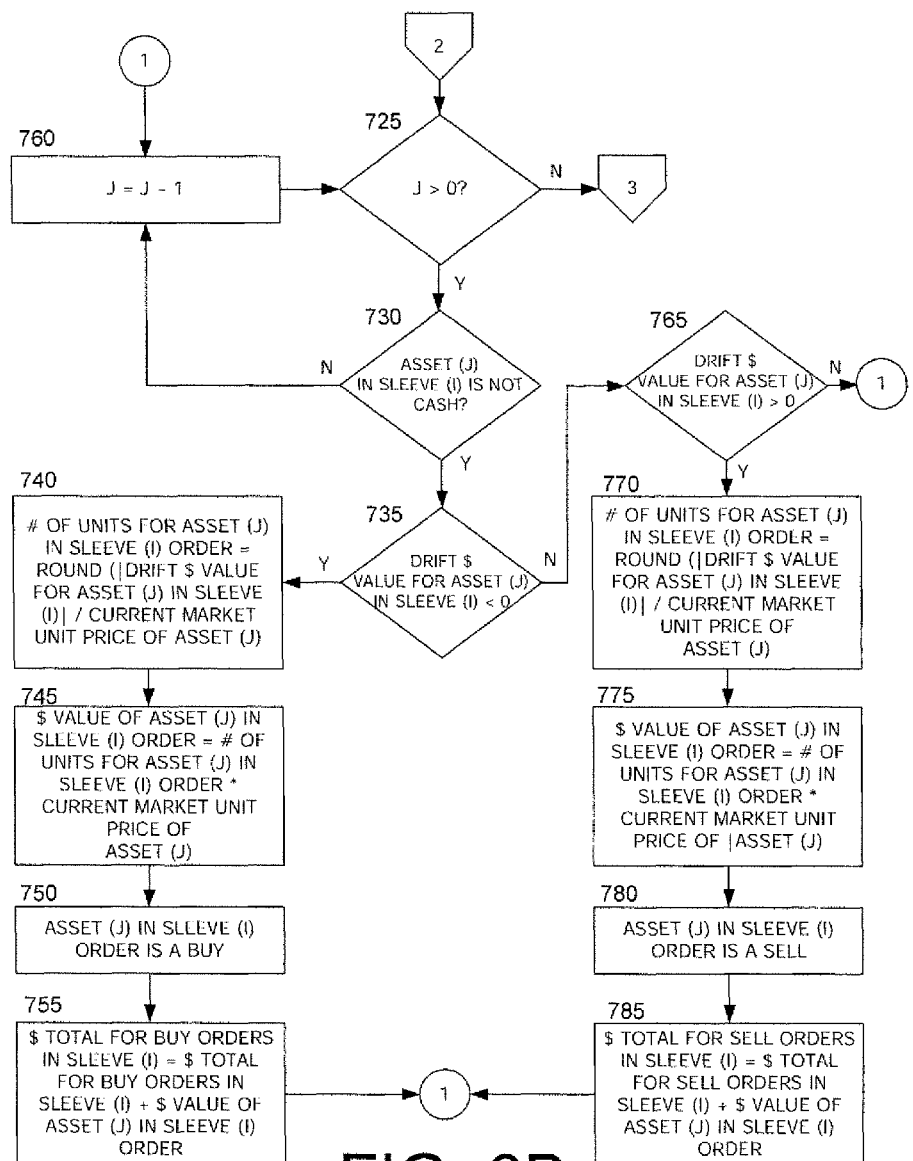
Figure 6C:
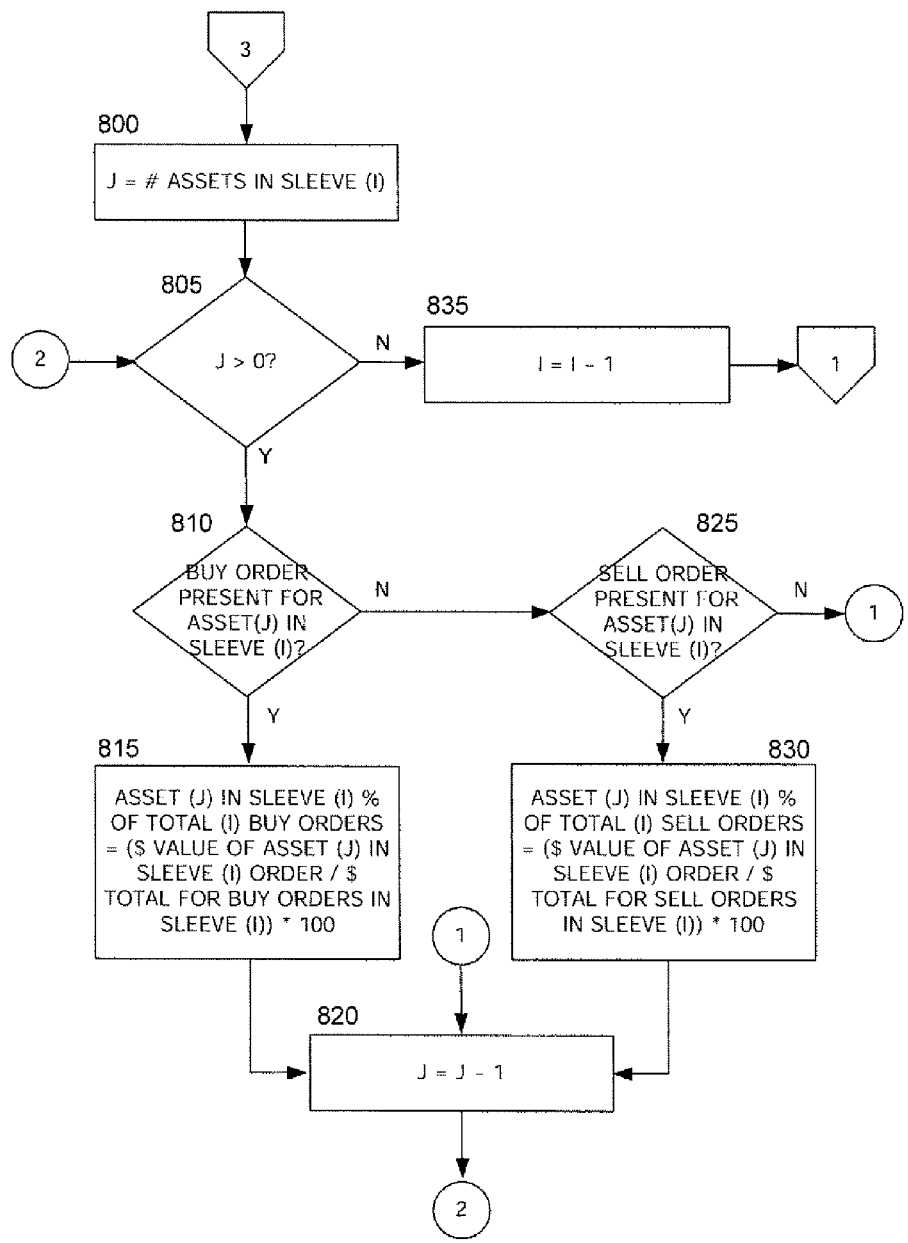

FIGS. 6A-6C illustrate step 220 of FIG. 2 in which the trade orders (e.g., sell and buy orders) necessary to rebalance to the overlay model may be determined in accordance with an embodiment of the present invention. Referring to step 700, the indicator I may be set to the number of sleeves within the MSP account. Step 705 determines whether all of the sleeves within the MSP account have been processed (e.g., I>0). If so (e.g., I>0 is not satisfied), then processing ends. However, if step 705 determines that there are still sleeves within the MSP account to be processed (e.g., I>0 is satisfied), then in step 710, the monetary total for buy orders in the Ith sleeve may be initialized (e.g., set to zero). Likewise, in step 715, the monetary total for sell orders in the Ith sleeve may also be initialized (e.g., set to zero). In step 720, indicator J may be set as the number of assets within the Ith sleeve.

Step 725 may determine whether all assets within the Ith sleeve have been processed (e.g., J>0). If all assets within the Ith sleeve have not been processed (e.g., J>0 is satisfied), then step 730 determines whether the Jth asset of the Ith sleeve is an asset other than cash. If the Jth asset is a cash asset, then the cash asset does not need to be processed, and processing continues with step 760. In step 760, the indicator J is decremented in step 760 and processing continues with step 725 determining whether there are still other assets within the Ith sleeve to process (e.g., J>0). On the other hand, if the Jth asset is a non-cash asset (e.g., a security), then processing proceeds to step 735. Step 735 determines whether the drift monetary value for the Jth asset in the Ith sleeve is less than zero (e.g., signifying an underweighted asset). If so, then processing continues with step 740 in which the number of units of the Jth asset in the Ith sleeve to be specified in a trade order may be determined as the rounded amount of the ratio of the absolute value of the drift monetary value for the Jth asset in the Ith sleeve to the current market unit price of the Jth asset. According to embodiments of the present invention, a variety of rounding methods may be utilized, including the following three exemplary rounding methods:

1. Up. If the adjusted quantity is between two integer multiples of a lot size, then increment to the higher integer multiple of the lot size.
2. Down. If the adjusted quantity is between two integer multiples of a lot size, then decrement to the lower integer multiple of the lot size.
3. Nearest. If the adjusted quantity is between two integer multiples of a lot size, then use the closest integer multiple of the lot size.

The rounding method may be a parameter determined as a function of some attribute of the current processing context (e.g., sponsor, program, strategy, money manager, or account). According to another embodiment of the present invention, the rounding method may vary according to a variety of conditions, including the type of asset, the quantity of the asset involved, and the volume of the asset involved.

In step 745, the monetary value of the Jth asset in the Ith sleeve trade order may be determined as the product of the rounded number of units of the Jth asset in the Ith sleeve and the current market unit price of the Jth asset. In step 750, the trade order for the Jth asset in the Ith sleeve may be specifically designated a buy order (e.g., for increasing the monetary value of an underweighted sleeve). In step 755, the monetary total for buy orders in the Ith sleeve may then be incremented to further include the monetary value of the Jth asset in the Ith sleeve order. Processing then proceeds to step 760, where indicator J is decremented and to step 725, which determines whether any assets in the Ith sleeve order still need to be processed.

Referring back to step 735, the drift monetary value for the Jth asset in the Ith sleeve may not be less than zero, in which case processing instead continues with step 765. Step 765 determines whether the drift monetary value for the Jth asset in the Ith sleeve is greater than zero (e.g., signifying an overweighted sleeve). If so, then processing proceeds to step 770. In step 770, the number of units for the Jth asset in the Ith sleeve order may be determined as the rounded amount of the ratio of the absolute value of the drift $ value for the Jth asset in the Ith sleeve to the current market unit price of the Jth asset. Again, a variety of rounding methods may be utilized, including the three exemplary rounding methods described above.

In step 775, the monetary value of the Jth asset in the Ith sleeve order may be determined as the product of the rounded number of units for the Jth asset in the Ith sleeve order and current market unit price of the Jth asset. In step 780, the trade order for the Jth asset in the Ith sleeve may be specifically designated a sell order (e.g., for decreasing the monetary value of an overweighted sleeve). In step 785, the monetary total for the sell orders in the Ith sleeve may be incremented to include the monetary value of the Jth asset in the Ith sleeve order. Processing then proceeds to step 760, where indicator J is decremented and to step 725, which determines whether any assets in the Ith sleeve order still need to be processed (e.g., J>0).

Once step 725 determines that all assets in the Ith sleeve order have been processed (e.g., J>0 is not satisfied) (or, alternatively, once all the trade orders for the Ith sleeve have been determined), processing continues with step 800. In step 800, the indicator J may be reset to be the number of assets in the Ith sleeve. Indicator J may also control processing of the loop between steps 805 and 820. Step 805 then determines whether all assets in the Ith sleeve have been processed (e.g., J>0). If so (e.g., J>0 is not satisfied), then indicator I may be decremented in step 835 and processing may return to step 705 to determine whether all sleeves in the MSP account have been processed.

On the other hand, if step 805, if all of the assets in the Ith sleeve have not been processed (e.g., J>0 is satisfied), then processing may continue with step 810. Step 810 may determine whether a buy order is present for the Jth asset in the Ith sleeve. If a buy order is present, then processing may continue with step 815, where the Jth asset in the Ith sleeve percentage of the Ith sleeve's monetary total for buy orders may be determined as the ratio of the monetary value of the Jth asset in the Ith sleeve buy order and the monetary total for buy orders in the Ith sleeve, where the result of the ratio is multiplied by 100 to express a percentage. Processing then proceeds to step 820, where indicator J is decremented to signify completion of processing the Jth asset in the Ith sleeve.

On the other hand, if a buy order is not present according to step 810, then processing may proceed to step 825. Step 825 determines whether a sell order is present for the Jth asset in the Ith sleeve. If so then, then processing may continue with step 830, where the Jth asset in the Ith sleeve percentage of the Ith sleeve's monetary total for sell orders may be determined as the ratio of the monetary value of the Jth asset in the Ith sleeve sell order and the monetary total for sell orders in the Ith sleeve, where the result is multiplied by 100 to indicate a percentage. Processing then proceeds to step 820, where indicator J is decremented to signify completion of processing the Jth asset in the Ith sleeve. Similarly, if step 825 determines that there is not sell order present for the Jth asset in the Ith sleeve, then processing continues with step 820, where indicator J is decremented.

Following decrementation of indicator J, processing continues with step 805 to determine whether all of the assets of the Ith sleeve have been processed. In step 805, once all assets in the Ith sleeve have been processed (e.g., J>0 is not satisfied), processing continues with step 835, where indicator I is decremented. Step 705 then determines whether all of the styles within the MSP account have been processed (e.g., I>0), as described previously.

Figure 7A:
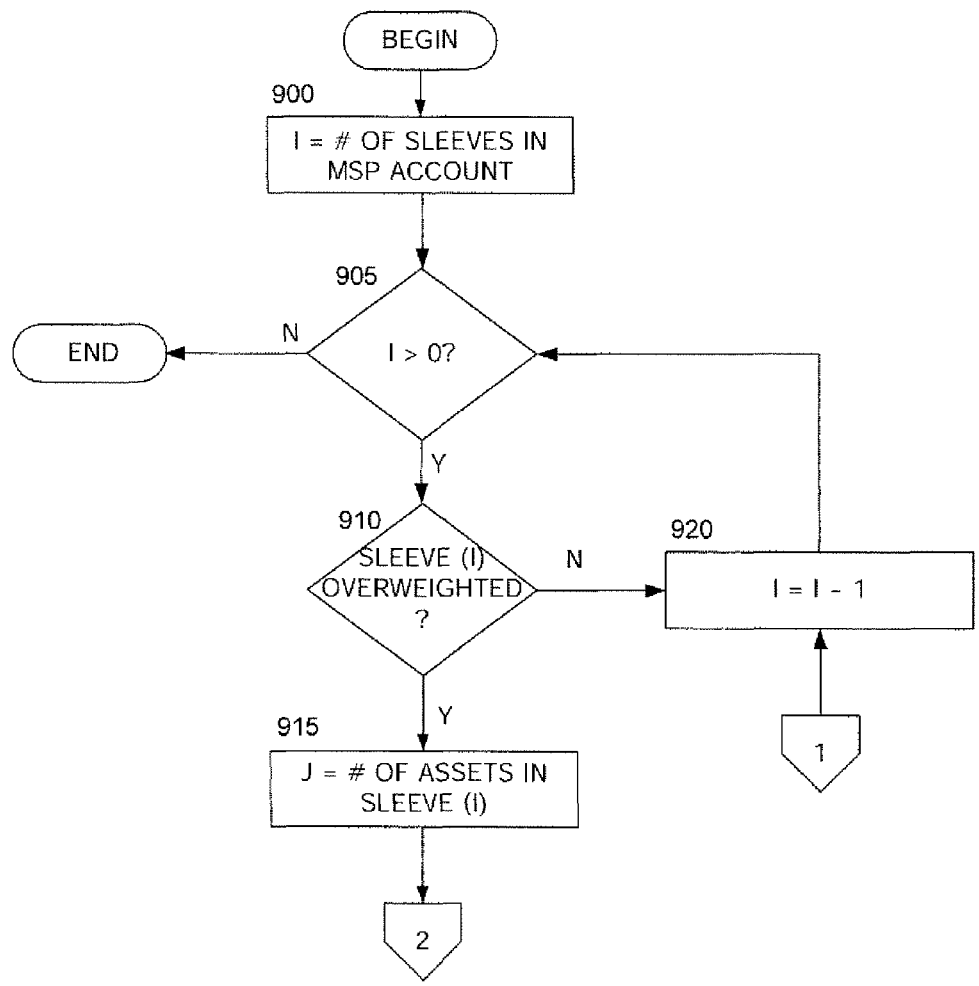
FIGS. 7A-7B illustrate an exemplary process in which cash flows from overweighted sleeves to be associated with each sell order may be calculated in accordance with an embodiment of the present invention.
Figure 7B:
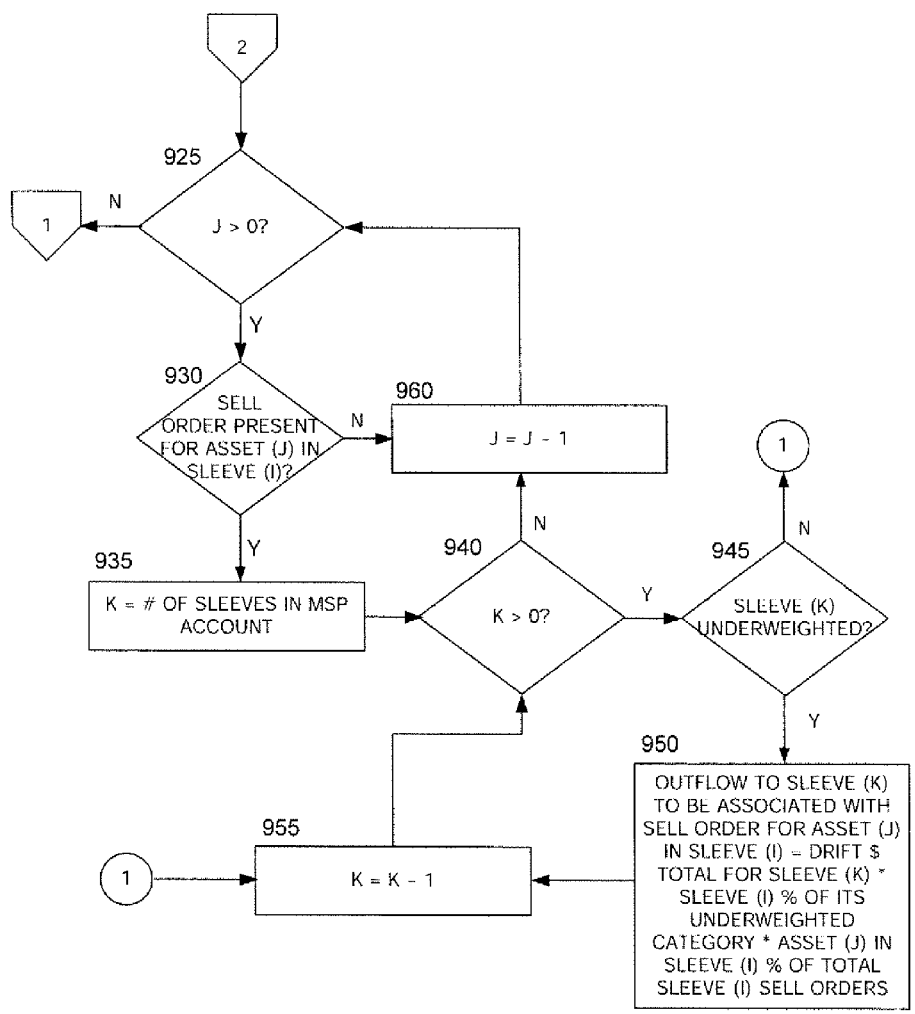

FIGS. 7A-7B illustrate step 230 of FIG. 2 in which cash flows from overweighted sleeves to be associated with each sell order may be calculated in accordance with an embodiment of the present invention. In step 900, indicator I may be set to the number of sleeves in the MSP account. Step 905 determines whether there are sleeves in the MSP account remaining to be processed (e.g., I>0). If not (e.g., I>0 is not satisfied), then the process ends. However, if step 905 determines that there are sleeves in the MSP account to be processed (e.g., I>0 is satisfied), then processing proceeds to step 910. Step 910 determines whether the Ith sleeve is overweighted. If the Ith sleeve is not overweighted, then indicator I is decremented in step 920 to signify completion of processing the Jth asset in the Ith sleeve. Processing then continues with step 905 determining whether any sleeves in the MSP account remain to be processed (e.g., I>0).

On the other hand, step 910 may determine that the Ith sleeve is overweighted. In this case, processing continues with step 915, where indicator J may be set to the number of assets in the Ith sleeve. Step 925 then determines whether any assets in the Ith sleeve need to be processed (e.g., J>0). If not (e.g., J>0 is not satisfied), processing continues with step 920, in which indicator I is decremented. After decrementing indicator I, processing continues with step 905 determining whether any sleeves in the MSP account remain to be processed.

However, step 925 may instead determine that there are assets in the Ith sleeve that still need to be processed (e.g., J>0 is satisfied). In this situation, processing continues with step 930 determining whether any sell orders are present for the Jth asset in the Ith sleeve. If no sell orders are present for the Jth asset in the Ith sleeve, then processing continues with step 960 decrementing indicator J. After decrementing indicator J, processing continues to step 925 determining whether any assets in the Ith sleeve still need to be processed (e.g., J>0).

On the other hand, step 930 may determine that there are indeed sell orders present for the Jth asset in the Ith sleeve. In step 935, another indicator K may be set to the number of styles within the MSP account. Indicator K may also control iterations of the loop between steps 940 and 955. Step 940 then checks to determine whether any sleeves in the MSP account still need to processed according to the loop (e.g., K>0). If not (e.g., K>0 is not satisfied), then processing continues with step 960 decrementing indicator J and step 925 determining whether any assets in the Ith sleeve still need to be processed. However, if there are sleeves in the MSP account that still need to be processed (e.g., K>0 is satisfied), then processing continues with step 945 determining whether the Kth style is underweighted. If so, then processing continues with step 950 determining the outflow to the Kth style to be associated with sell order for the Jth asset in the Ith sleeve as an expected inflow requirement for the Ith sleeve to be satisfied by across-sleeve rebalancing (e.g., the products of the drift monetary total for the Kth style and the Ith sleeve percentage of its overweighted category and the Jth asset in Ith sleeve percentage of the total monetary value of Ith sleeve sell orders).

In step 950, the outflow to the Kth style may include a "deliver" of the calculated amount of cash from the Ith sleeve and a corresponding "receive" of the same calculated amount of cash into the Kth style. According to an embodiment of the present invention, the outflow to the Kth style in step 950 may be based upon the current market prices for assets being traded in both the Ith sleeve (defining proceeds from sales) and the Kth style (defining inflow requirements) holding until execution time. According to another embodiment of the present invention, an alternative is to allow the inflow requirements of the Kth style to be determined at execution time (as a result of actual trading prices for that style) and merely calculate a percentage that is the product of the Ith sleeve percentage of its overweighted category and the Jth asset in Ith sleeve percentage of the total monetary value of Ith sleeve sell orders.

Next, in step 955, indicator K is decremented and step 940 determines whether any sleeves in the MSP account still need to be processed according to the loop (e.g., K>0). However, step 945 may determine that the Kth style is not underweighted. In this situation, processing continues with step 955 decrementing the indicator K and step 940 determining whether any sleeves in the MSP account still need to be processed according to the loop.

Figure 8A:
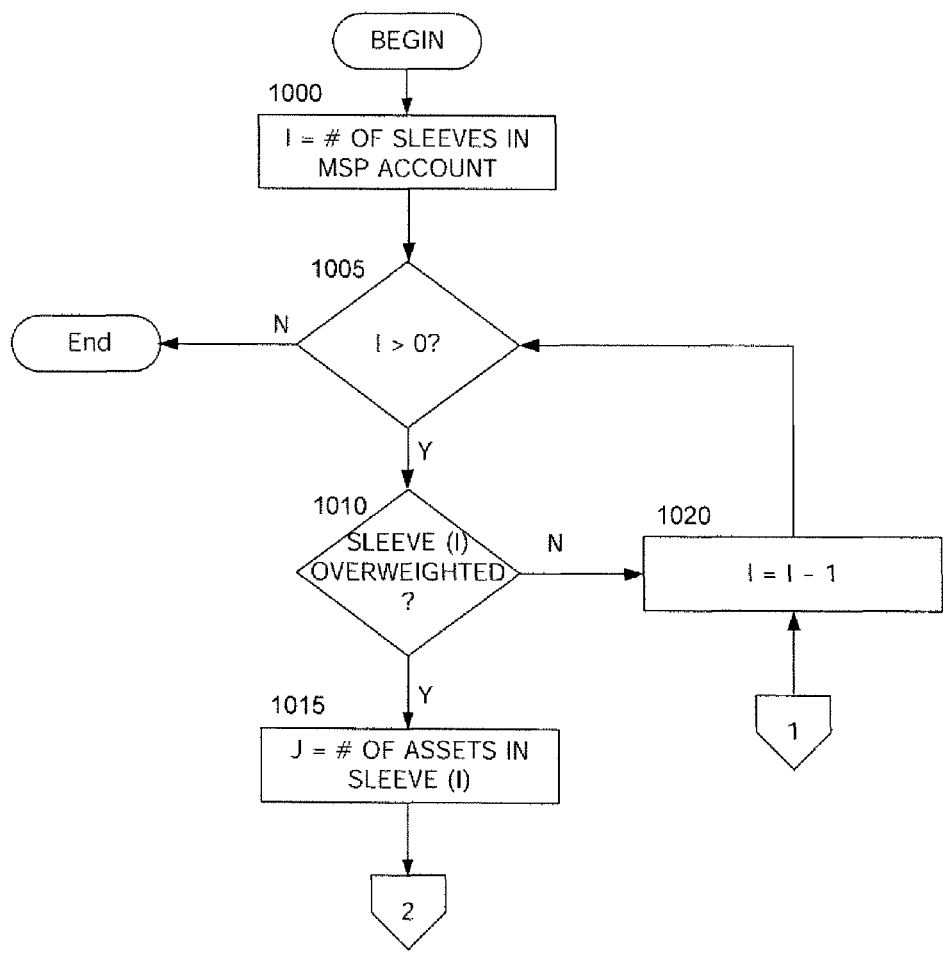
FIGS. 8A and 8B illustrate a process in which cash may be flowed from overweighted sleeves at successful execution of the sell orders, according to an embodiment of the present invention.
Figure 8B:
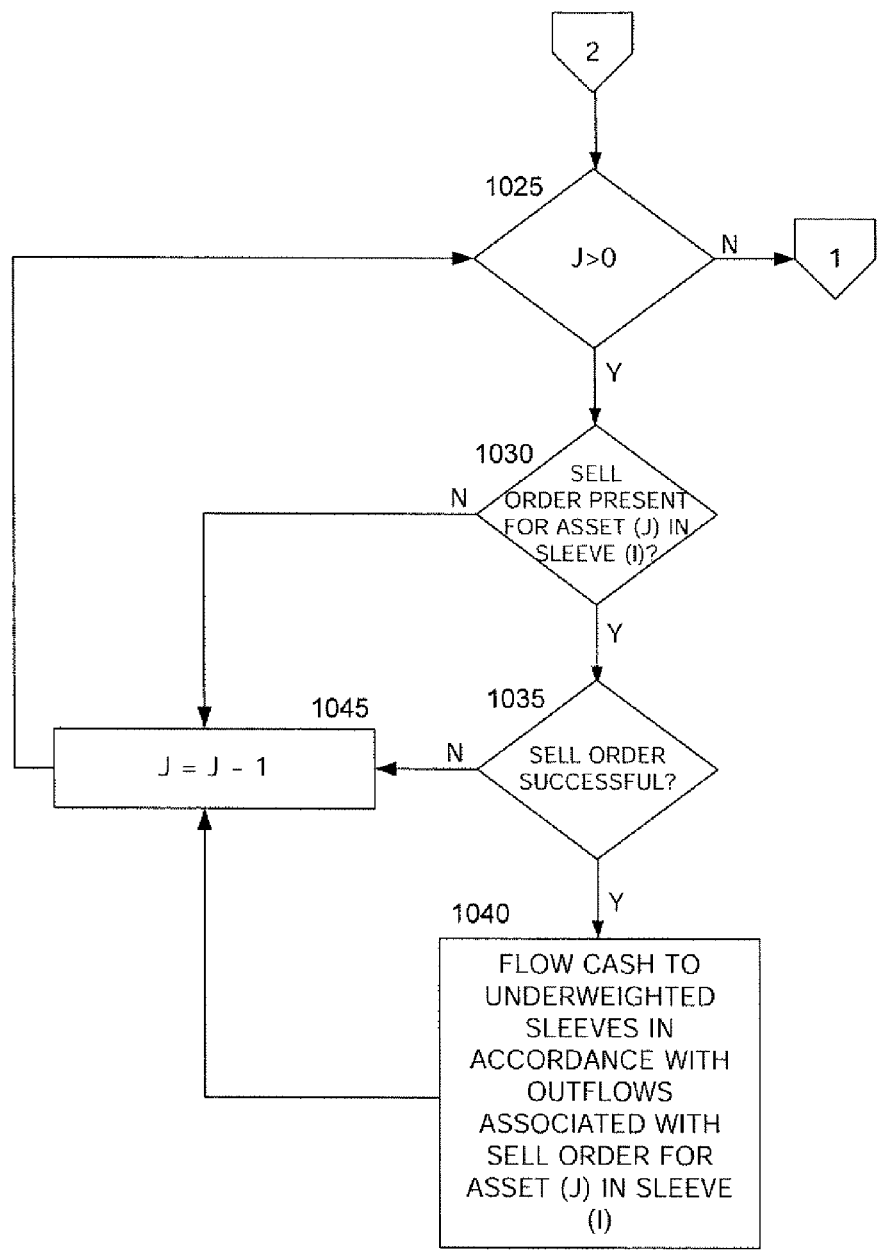

FIGS. 8A and 8B illustrate step 230 of FIG. 2 in which cash may be flowed from overweighted sleeves at successful execution of the sell orders, according to an embodiment of the present invention. In step 1000, indicator I may be set to the number of sleeves in the MSP account. Step 1005 then determines whether there are any sleeves in the MSP account remaining to be processed (e.g., I>0). If not (e.g., I>0 is not satisfied), then processing ends. If so (e.g., I>0 is satisfied), then processing continues with step 1010. Step 1010 determines whether the Ith sleeve is overweighted. If not, then indicator I is decremented in step 1020 and processing continues with step 1005 determining whether there are any remaining sleeves in the MSP account to be processed. However, if step 1010 determines that the Ith sleeve is overweighted, then processing proceeds with step 1015. In step 1015, indicator J is set to be the number of assets in the Ith sleeve.

Step 1025 then proceeds to determine whether there are assets in the Ith sleeve remaining to be processed (e.g., J>0). If there are no assets in the Ith sleeve remaining to be processed (e.g., J>0 is not satisfied), then processing continues with step 1020, in which indicator I is decremented. After indicator I is decremented, step 1005 determines whether there are any sleeves in the MSP account remaining to be processed.

On the other hand, if there are still assets in the Ith sleeve remaining to be processed (e.g., J>0 is satisfied), then processing continues with step 1030 determining whether there is a sell order present for the Jth asset. If there is a sell order present, then processing continues with step 1035 determining whether the sell order was successful. Whether the sell order was successful may be determined according to whether any account restrictions have been identified and/or resolved, according to an embodiment of the present invention. Likewise, potential wash sale violations may impact whether the sell orders can be executed successfully in accordance with an embodiment of the present invention.

If the sell order was successful, then processing continues with step 1040 flowing cash to underweighted sleeves in accordance with outflows associated with the sell order for the Jth asset in the Ith sleeve. According to an embodiment of the present invention, the cash flowed to underweighted sleeves may be utilized for executing one or more buy orders. According to an alternative embodiment of the present invention, if only a percentage was calculated in defining the outflows in step 950, then in step 1040, the monetary amount of the outflow may be determined as a product of the actual inflow requirement (given execution prices) for the associated underweighted sleeve and the percentage that was calculated in step 950. Processing then continues with step 1045 in which the indicator J is decremented. After the indicator J is decremented, processing continues back with step 1025 determining whether there are any remaining assets in the Ith sleeve to be processed.

Referring back to step 1030, if there is no sell order present for the Jth asset in the Ith sleeve, then processing continues with step 1045. Likewise, if in step 1035, the sell order was determined not to be successful, then processing also continues with step 1045. In step 1045, the indicator J is decremented. Processing then continues with step 1030 determining whether there are any remaining assets in the Ith sleeve to be processed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method, comprising:
identifying, by a computerized asset management system comprising one or more computers, a first set of two or more underweighted investment sleeves and a second set of one or more overweighted investment sleeves within an investment account comprising a plurality of investment sleeves, wherein each investment sleeve is identified as underweighted or overweighted based at least in part on a respective target value associated with the investment sleeve, wherein each investment sleeve includes a respective at least one asset comprising at least one non-cash asset, and wherein each investment sleeve is associated with a respective investment strategy for managing the at least one asset;
generating, by the computerized asset management system, one or more sell orders associated with a first overweighted investment sleeve in the second set to rebalance the first overweighted investment sleeve to the respective target value associated with the first overweighted investment sleeve, wherein the one or more sell orders comprise a first sell order for a first asset in the first overweighted sleeve;
determining by the computerized asset management system, an overweighted sleeve percentage associated with the first overweighted sleeve based at least in part upon a ratio of (i) an overweighted drift amount for the first overweighted investment sleeve to (ii) an aggregate overweighted drift total attributable to the second set;
determining, by the computerized asset management system, a sell order percentage based at least in part upon a ratio of (i) a market valuation of the first sell order to (ii) an aggregate market valuation of the one or more sell orders for the first overweighted investment sleeve;
determining, by the computerized asset management system, a plurality of cash outflows associated with the first cell order, wherein each of the plurality of cash outflows corresponds to a respective cash inflow to a respective underweighted sleeve in the first set, and wherein each of the plurality of cash outflows is determined by;
determining, by the computerized asset management system, a respective underweighted drift amount for the respective underweighted sleeve, and
deriving, by the computerized asset management system, the cash outflow based at least in part upon a combination of (i) the respective underweighted drift amount for the respective underweighted sleeve, (ii) the sleeve overweighted percentage, and (iii) the sell order percentage; and
associating, by the computerized asset management system, a respective tag with each of the plurality of cash outflows, wherein each respective tag is indicative of a respective underweighted sleeve for receiving the respective cash outflow as a respective cash inflow; and
performing, by the computerized asset management system, at least one of the plurality of cash outflows to flow cash to at least one of the two or more underweighted sleeves in the first set responsive to execution of the first sell order, wherein performing the at least one of the plurality of cash flows comprises identifying the at least one of the two or more underweighted sleeves based at least in part on each respective tag associated with the at least one of the plurality of cash outflows.

2. The method of claim 1, wherein each respective target value is defined by a model associated with the investment account.

3. The method of claim 2, wherein the model is an overlay model.

4. The method of claim 1, wherein each investment sleeve is associated with a respective one or more money managers.

5. The method of claim 1, wherein the at least one non-cash asset includes one or more of units or shares of a stock, a bond, a mutual fund, an exchange traded fund (ETF), an exchange traded note (ETN), an iShare, a Treasury, foreign currency, an option, or commodity contract.

6. The method of claim 1, wherein identifying the first set two or more underweighted investment sleeves and the second set of one or more overweighted investment sleeves includes calculating a respective drift amount associated with each of the two or more underweighted investment sleeves and each of the one or more overweighted investment sleeves.

7. The method of claim 6, wherein the respective drift amount is determined as a function of an actual monetary total of the respective investment sleeve and a respective target monetary total associated with the respective target value for the respective investment sleeve.

8. The method of claim 7, wherein the respective drift amount is determined as a difference between the respective actual monetary total of the respective investment sleeve and the respective target monetary total for the respective investment sleeve.

9. The method of claim 1, wherein the first sell order is for a quantity of units of the first asset, and wherein the quantity of units is determined as a function of a drift amount for the first asset and a current market unit price of the first asset.

10. The method of claim 9, wherein the drift amount for the first asset is determined as a difference between an actual monetary value of the first asset and a respective target monetary value for the first asset.

11. The method of claim 9, wherein the quantity of units of the first asset is determined by rounding a ratio of the drift amount for the first asset and the current market unit price of the first asset according to a rounding method.

12. The method of claim 11, wherein the rounding method includes one of an up rounding method, a down rounding method, or a nearest rounding method.

13. The method of claim 11, wherein the rounding method is selected from a plurality of rounding methods based at least in part on a parameter determined by an attribute of a sponsor, a program, an investment strategy, a money manager, or the investment account.

14. The method of claim 1, further comprising:
preventing at least one sell order of the one or more sell orders from being executed based at least in part on one or more rules.

15. The method of claim 14, wherein preventing the at least one sell order from being executed comprises:
detecting, by the computerized asset management system, a violation, wherein the violation comprises one of: i) a wash sale violation or ii) a restriction violation; and
preventing the at least one of the one or more sell orders from being executed responsive to detecting the violation.

16. The method of claim 1, wherein an amount of each performed cash outflow is not reported to a custodian.

17. The method of claim 1, wherein performing at least one of the one or more cash outflows includes performing a deliver to transaction for at least one of the one or more overweighted investment sleeves and performing a receive from transaction for at least one of the two or more underweighted investment sleeves.

18. A computer-implemented system, comprising:
at least one memory storing computer-executable instructions; and
at least one processor in communication with the at least one memory, wherein the at least one processor is configured to access the at least one memory and to execute the computer-executable instructions to:
identify a first set of two or more underweighted investment sleeves and a second set of one or more overweighted investment sleeves within an investment account comprising a plurality of investment sleeves, wherein each investment sleeve is identified as underweighted or overweighted based at least in part on a respective target value associated with the investment sleeve, wherein each investment sleeve includes a respective at least one asset comprising at least one non-cash asset, and wherein each investment sleeve is associated with a respective investment strategy for managing the at least one asset;
generate one or more sell orders associated with a first overweighted investment sleeve to rebalance the first overweighted investment sleeve to the respective target value associated with the first overweighted investment sleeve, wherein the one or more sell orders comprise a first sell for a first asset in the first overweighted sleeve;
determine an overweighted sleeve percentage associated with the first overweighted sleeve based at least in part upon a ratio of (i) an overweighted drift amount for the first overweighted investment sleeve to (ii) an aggregate overweighted drift total attributable to the second set;
determine a sell order percentage based at least in part upon a ratio of (i) a market valuation of the first cell order to (ii) an aggregate market valuation of the one or more sell orders for the first overweighted investment sleeve;
determine a plurality of cash outflows associated with the first sell order, wherein each of the plurality of cash outflows corresponds to a respective cash inflow to a respective underweighted sleeve in the first set, and wherein the at least one processor is configured to determine each of the plurality of cash outflows by executing the computer-executable instructions to:
determine a respective underweighted drift amount for the respective underweighted sleeve, and
derive the cash outflow based at least in part upon a combination of (i) the respective underweighted drift amount for the respective underweighted sleeve, (ii) the sleeve overweighted percentage, and (iii) the sell order percentage;
wherein the at least one processor is further configured to execute the computer-executable instructions to:
associate a respective tag with each of the plurality of cash outflows, wherein each respective tag is indicative of a respective underweighted sleeve for receiving the respective cash outflow as a respective cash inflow; and
perform at least one of the plurality of cash outflows to flow cash to at least one of the two or more underweighted sleeves in the first set responsive to execution of the first sell order, wherein the at least one processor is configured to perform the at least one of the plurality of cash flows by executing the computer-executable instructions to identify the at least one of the two or more underweighted sleeves based at least in part on each respective tag associated with the at least one of the plurality of cash outflows.

19. The system of claim 18, wherein each respective target value is defined by a model associated with the investment account.

20. The system of claim 19, wherein the model is an overlay model.

21. The system of claim 18, wherein each investment sleeve is associated with a respective one or more money managers.

22. The system of claim 18, wherein the at least one non-cash asset includes one or more of units or shares of a stock, a bond, a mutual fund, an exchange traded fund (ETF), an exchange traded note (ETN), an iShare, a Treasury, foreign currency, an option, or commodity contract.

23. The system of claim 18, wherein the at least one processor is configured to identify the first set of two or more underweighted sleeves and the second set of one or more overweighted sleeves by executing the computer-executable instructions to calculate a respective drift amount associated with each of the two or more underweighted sleeves and each of the one or more overweighted sleeves.

24. The system of claim 23, wherein the at least one processor is configured to execute the computer-executable instructions to calculate the respective drift amount as a function of an actual monetary total of the respective investment sleeve and a respective target monetary total associated with the respective target value for the respective investment sleeve.

25. The system of claim 24, wherein the at least one processor is configured to execute the computer-executable instructions to calculate the respective drift amount as a difference between the respective actual monetary total of the respective investment sleeve and the respective target monetary total for the respective investment sleeve.

26. The system of claim 18, wherein the first sell order is for a quantity of units of the first asset, and wherein the at least one processor is further configured to execute the computer-executable instructions to determine the quantity of units of the first asset as a function of a drift amount for the first asset and a current market unit price of the first asset.

27. The system of claim 26, wherein the at least one processor is configured to execute the computer-executable instructions to determine the drift amount for the first asset as a difference between an actual monetary value of the first asset and a respective target monetary value for the first asset.

28. The system of claim 26, wherein the at least one processor is configured to determine the quantity of units of the first asset specified in the first sell order by executing the computer-executable instructions to round a ratio of the drift amount for the first asset and the current market unit price of the first asset according to a rounding method.

29. The system of claim 28, wherein the rounding method includes one of an up rounding method, a down rounding method, or a nearest rounding method.

30. The system of claim 28, wherein at least one processor is configured to execute the computer-executable instructions to select the rounding method from a plurality of rounding methods based at least in part on a parameter determined by an attribute of a sponsor, a program, an investment strategy, a money manager, or the investment account.

31. The system of claim 1, wherein the at least one processor is further configured to execute the computer-executable instructions to prevent at least one sell order of the one or more sell orders from being executed based at least in part on one more rules.

32. The system of claim 31, wherein the at least one processor is configured to prevent the at least one sell order from being executed by executing the computer-executable instructions to:
    detect a violation, wherein the violation comprises one of:
        (i) a wash sale violation or (ii) a restriction violation, and
    prevent the at least one sell order from being executed responsive to detecting the violation.

33. The system of claim 18, wherein an amount of each performed cash outflow is not reported to a custodian.

34. The system of claim 18, wherein the at least one processor is configured to perform the at least one of the one or more cash outflows by executing the computer-executable instructions to perform a deliver to transaction for at least one of the one or more overweighted investment sleeves and to perform a receive from transaction for at least one of the two or more underweighted investment sleeves.

* * * * *